US009575213B2

(12) United States Patent
Nagaya et al.

(10) Patent No.: US 9,575,213 B2
(45) Date of Patent: Feb. 21, 2017

(54) OPTICAL FILTER, AND SOLID-STATE IMAGE PICKUP DEVICE AND CAMERA MODULE USING THE OPTICAL FILTER

(71) Applicant: JSR CORPORATION, Tokyo (JP)

(72) Inventors: Katsuya Nagaya, Tokyo (JP); Hiroyuki Kishida, Tokyo (JP); Takashi Tsubouchi, Tokyo (JP); Mitsuru Nakajima, Tokyo (JP); Ran Mitsuboshi, Tokyo (JP); Yukie Tanaka, Tokyo (JP)

(73) Assignee: JSR CORPORATION, Tokyo (JP)

( * ) Notice: Subject to any disclaimer, the term of this patent is extended or adjusted under 35 U.S.C. 154(b) by 0 days.

(21) Appl. No.: 14/351,268

(22) PCT Filed: Oct. 12, 2012

(86) PCT No.: PCT/JP2012/076388
§ 371 (c)(1),
(2) Date: Apr. 11, 2014

(87) PCT Pub. No.: WO2013/054864
PCT Pub. Date: Apr. 18, 2013

(65) Prior Publication Data
US 2014/0264202 A1  Sep. 18, 2014

(30) Foreign Application Priority Data

Oct. 14, 2011 (JP) .................................. 2011-227134
Sep. 27, 2012 (JP) .................................. 2012-214584

(51) Int. Cl.
*F21V 9/04*  (2006.01)
*F21V 9/06*  (2006.01)
(Continued)

(52) U.S. Cl.
CPC ............. *G02B 1/04* (2013.01); *C09B 23/0066* (2013.01); *C09B 57/007* (2013.01);
(Continued)

(58) Field of Classification Search
USPC ........ 252/582, 586, 587; 428/332, 442, 520, 428/339; 430/7; 548/427, 455; 359/580
See application file for complete search history.

(56) References Cited

U.S. PATENT DOCUMENTS 4,857,431 A    8/1989  Kato et al.
5,296,519 A    3/1994  Otsuka
(Continued)

FOREIGN PATENT DOCUMENTS

JP    60-228448 A    11/1985
JP    63-124054 A    5/1988
(Continued)

OTHER PUBLICATIONS

Shirai et al., "Phthalocyanine: Its Chemistry and Functions", published Feb. 28, 1997, Industrial Publishing & Consulting, Inc., 42 pages.
(Continued)

*Primary Examiner* — Bijan Ahvazi
(74) *Attorney, Agent, or Firm* — Oblon, McClelland, Maier & Neustadt, L.L.P.

(57) ABSTRACT

The problem of the present invention is to overcome drawbacks of conventional optical filters such as near-infrared cut filters and to provide an optical filter which generates little scatted light even during light absorption and has excellent transmittance property. The optical filter of the present invention is characterized by containing a squarylium-based compound and a compound which absorbs or quenches fluorescence of the squarylium-based compound. The optical filter of the present invention preferably contains a
(Continued)

near-infrared absorbing dye containing a squarylium compound (A) and at least one compound (B) selected from the group consisting of a phthalocyanine-based compound (B-1) and a cyanine-based compound (B-2).

14 Claims, 2 Drawing Sheets

(51) Int. Cl.
    *G02B 5/22*     (2006.01)
    *G02B 5/26*     (2006.01)
    *G02B 1/04*     (2006.01)
    *G02B 5/20*     (2006.01)
    *C09B 57/00*     (2006.01)
    *C09B 23/01*     (2006.01)
    *C09B 67/22*     (2006.01)
    *G03F 1/00*     (2012.01)
    *H04M 1/02*     (2006.01)

(52) U.S. Cl.
    CPC ...... *C09B 67/0033* (2013.01); *C09B 67/0034* (2013.01); *G02B 5/208* (2013.01); *G02B 5/223* (2013.01); *G02B 2207/113* (2013.01); *H04M 1/0264* (2013.01)

(56) References Cited

U.S. PATENT DOCUMENTS

| | | | |
|---|---|---|---|
| 5,401,438 | A | 3/1995 | Otsuka |
| 5,523,027 | A | 6/1996 | Otsuka |
| 5,543,086 | A | 8/1996 | Bertelson et al. |
| 6,020,490 | A | 2/2000 | Reinehr et al. |
| 2003/0008132 | A1* | 1/2003 | Mizumoto et al. ........... 428/332 |
| 2004/0137367 | A1 | 7/2004 | Kitayama et al. |
| 2006/0257760 | A1* | 11/2006 | Mori et al. ........................ 430/7 |
| 2008/0048155 | A1* | 2/2008 | Toriniwa et al. ............. 252/587 |
| 2008/0132667 | A1 | 6/2008 | Makinoshima et al. |
| 2009/0081574 | A1* | 3/2009 | Hasegawa ............ G03G 9/0912 430/108.21 |
| 2012/0197026 | A1* | 8/2012 | Maeda et al. ................. 548/455 |

FOREIGN PATENT DOCUMENTS

| | | |
|---|---|---|
| JP | 01-146846 A | 6/1989 |
| JP | 01-228960 A | 9/1989 |
| JP | 04-23868 A | 1/1992 |
| JP | 06-200113 A | 7/1994 |
| JP | 2846091 B2 | 10/1998 |
| JP | 2864475 B2 | 12/1998 |
| JP | 2001-040234 A | 2/2001 |
| JP | 3196383 B2 | 8/2001 |
| JP | 3366697 B2 | 11/2002 |
| JP | 2003-035818 A | 2/2003 |
| JP | 2005-156935 A | 6/2005 |
| JP | 3699464 B2 | 7/2005 |
| JP | 3703869 B2 | 10/2005 |
| JP | 2006-199945 A | 8/2006 |
| JP | 2007-111940 A | 5/2007 |
| JP | 2007-169315 A | 7/2007 |
| JP | 2007-271745 A | 10/2007 |
| JP | 4081149 B2 | 4/2008 |
| JP | 2008-120924 A | 5/2008 |
| JP | 2008-163107 A | 7/2008 |
| JP | 2008-181121 A | 8/2008 |
| JP | 2009-108267 A | 5/2009 |
| JP | 2010-160380 A | 7/2010 |
| JP | 2010-241873 A | 10/2010 |
| JP | 2010-285505 A | 12/2010 |
| JP | 4740631 B2 | 8/2011 |
| JP | 2011-197450 A | 10/2011 |
| JP | 2012-008532 A | 1/2012 |
| WO | 2006/006573 A1 | 1/2006 |
| WO | 2006/070717 A1 | 7/2006 |
| WO | 2011/086785 A1 | 7/2011 |

OTHER PUBLICATIONS

International Search Report for corresponding International Application No. PCT/JP2012/076388, dated Jan. 15, 2013, 2 pages.
Office Action issued Aug. 9, 2016, in Japanese Patent Application No. 2013-538577 (w/ computer generated machine translation).

* cited by examiner

OPTICAL FILTER, AND SOLID-STATE IMAGE PICKUP DEVICE AND CAMERA MODULE USING THE OPTICAL FILTER

TECHNICAL FIELD

The present invention relates to an optical filer and a device using an optical filter. More particularly, the present invention relates to an optical filter containing a specific dye compound of solvent-soluble type, and a solid-state image pickup device and a camera module each of which uses the optical filter.

BACKGROUND ART

In solid-state image pickup devices, such as video cameras, digital still cameras and cellular phones having camera function, a CCD or CMOS image sensor that is a solid-state image sensor of color image is used. In such a solid-state image sensor, silicon photo diode having sensitivity to near-infrared rays that cannot be perceived by human eye is used in its light-receiving section. For such a solid-state image sensor, it is necessary to make correction of visibility so that a natural color might be obtained when an image is seen with human eye, and an optical filter (e.g., near-infrared cut filter) to selectively transmit or cut rays of specific wavelength region is frequently used.

As such near-infrared cut filters, those manufactured by various methods have been used in the past. For example, in Japanese Patent Laid-Open Publication No. 1994-200113 (patent literature 1), a near-infrared cut filter in which a transparent resin is used as a base material and a near-infrared absorbing dye is incorporated into the transparent resin is described.

Optical filters, such as the near-infrared cut filter containing a near-infrared absorbing dye described in the patent literature 1, are widely known. As a result of earnest studies, the present applicant has found that a squarylium-based dye among near-infrared absorbing dyes is excellent particularly in steepness in absorption and height of visible light transmittance, and has proposed a near-infrared cut filter containing a squarylium-based dye and having a wide viewing angle in Japanese Patent Laid-Open Publication No. 2012-8532 (patent literature 2).

However, since the squarylium-based dye generally has fluorescence in view of its molecular structure, it sometimes generates scattered light during light absorption, and the image quality of camera is sometimes lowered.

CITATION LIST

Patent Literature

Patent literature 1: Japanese Patent Laid-Open Publication No. 1994-200113
Patent literature 2: Japanese Patent Laid-Open Publication No. 2012-8532

SUMMARY OF INVENTION

Technical Problem

The object of the present invention is to overcome drawbacks of conventional optical filters such as near-infrared cut filters and to provide an optical filter which generates little scatted light even during light absorption and has excellent transmittance property and a device using the optical filter.

Solution to Problem

The present inventors have earnestly studied in order to attain the above object. As a result, the present inventors have found that an optical filter which generates little scattered light during light absorption and is excellent in transmittance property is obtained by using, as near-infrared absorbing dyes, a squarylium-based compound and a specific compound that absorbs or quenches fluorescence of the squarylium-based compound in combination, and they have accomplished the present invention. Embodiments of the present invention are shown below.

[1] An optical filter containing a near-infrared absorbing dye containing a squarylium-based compound (A) and at least one compound (B) selected from the group consisting of a phthalocyanine-based compound (B-1) and a cyanine-based compound (B-2).

[2] The optical filter as stated in the item [1], wherein the absorption maximum of the squarylium-based compound (A) is present on the side of shorter wavelength than the absorption maximum of the compound (B).

[3] The optical filter as stated in the item [2], wherein the squarylium-based compound (A) has an absorption maximum in the wavelength region of not less than 600 nm but less than 800 nm, and the compound (B) has an absorption maximum in the wavelength region of more than 600 nm but not more than 800 nm.

[4] The optical filter as stated in any one of the items [1] to [3], wherein when the amount of the whole near-infrared absorbing dye is 100% by weight, the content of the squarylium-based compound (A) is 20 to 95% by weight, and the content of the compound (B) is 5 to 80% by weight.

[5] The optical filter as stated in any one of the items [1] to [4], wherein the squarylium-based compound (A) is a compound represented by the following formula (I) or (II):

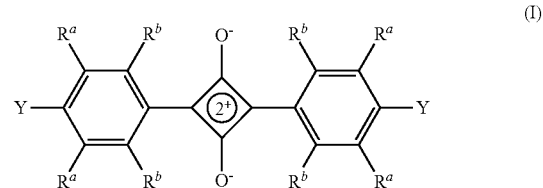

wherein $R^a$, $R^b$ and Y satisfy the following condition (i) or (ii):

(i) plural $R^a$ are each independently a hydrogen atom, a halogen atom, a sulfo group, a hydroxyl group, a cyano group, a nitro group, a carboxyl group, a phosphoric acid group, $-L^1$ or a $-NR^e R^f$ group ($R^e$ and $R^f$ are each independently a hydrogen atom, $-L^a$, $-L^b$, $-L^c$, $-L^d$ or $-L^e$), plural $R^b$ are each independently a hydrogen atom, a halogen atom, a sulfo group, a hydroxyl group, a cyano group, a nitro group, a carboxyl group, a phosphoric acid group, $-L^1$ or a $-NR^g R^h$ group ($R^g$ and $R^h$ are each independently a hydrogen atom, $-L^a$, $-L^b$, $-L^c$, $-L^d$, $-L^e$ or a $-C(O)R^i$ group ($R^i$ is $-L^a$, $-L^b$, $-L^c$, $-L^d$ or $-L^e$)), plural Y are each independently a —NR$^j$R$^k$ group (R$^j$ and R$^k$ are each independently a hydrogen atom, -L$^a$, -L$^b$, -L$^c$, -L$^d$ or -L$^e$), L$^1$ is (L$^a$) an aliphatic hydrocarbon group of 1 to 9 carbon atoms, which may have a substituent L, (L$^b$) a halogen-substituted alkyl group of 1 to 9 carbon atoms, which may have a substituent L, (L$^c$) an alicyclic hydrocarbon group of 3 to 14 carbon atoms, which may have a substituent L, (L$^d$) an aromatic hydrocarbon group of 6 to 14 carbon atoms, which may have a substituent L, (L$^e$) a heterocyclic group of 3 to 14 carbon atoms, which may have a substituent L, (L$^f$) an alkoxy group of 1 to 9 carbon atoms, which may have a substituent L, (L$^g$) an acyl group of 1 to 9 carbon atoms, which may have a substituent L, or (L$^h$) an alkoxycarbonyl group of 1 to 9 carbon atoms, which may have a substituent L, the substituent L is at least one kind selected from the group consisting of an aliphatic hydrocarbon group of 1 to 9 carbon atoms, a halogen-substituted alkyl group of 1 to 9 carbon atoms, an alicyclic hydrocarbon group of 3 to 14 carbon atoms, an aromatic hydrocarbon group of 6 to 14 carbon atoms and a heterocyclic group of 3 to 14 carbon atoms, and the above L$^a$ to L$^h$ may further have at least one atom or group selected from the group consisting of a halogen atom, a sulfo group, a hydroxyl group, a cyano group, a nitro group, a carboxyl group, a phosphoric acid group and an amino group;

(ii) at least one of two R$^a$ on one benzene ring and Y on the same benzene ring are bonded to each other to form a heterocyclic ring of 5 or 6 constituent atoms containing at least one nitrogen atom, and the heterocyclic ring may have a substituent, and R$^b$ and R$^a$ which does not take part in the formation of the heterocyclic ring have the same meanings as those of R$^b$ and R$^a$ in the condition (i), respectively;

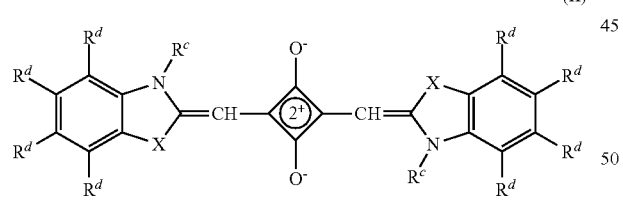

(II)

wherein X is O, S, Se, N—R$^c$ or C—R$^d$R$^d$, plural R$^c$ are each independently a hydrogen atom, -L$^a$, -L$^b$, -L$^c$, -L$^d$ or -L$^e$, plural R$^d$ are each independently a hydrogen atom, a halogen atom, a sulfo group, a hydroxyl group, a cyano group, a nitro group, a carboxyl group, a phosphoric acid group, -L$^1$ or a —NR$^e$R$^f$ group, and neighboring R$^d$ and R$^d$ may be bonded to each other to form a ring which may have a substituent, and L$^a$ to L$^e$, L$^1$, R$^e$ and R$^f$ have the same meanings as those of L$^a$ to L$^e$, L$^1$, R$^e$ and R$^f$ defined in the formula (I).

[6] The optical filter as stated in any one of the items [1] to [5], wherein the phthalocyanine-based compound (B-1) is a compound represented by the following formula (III):

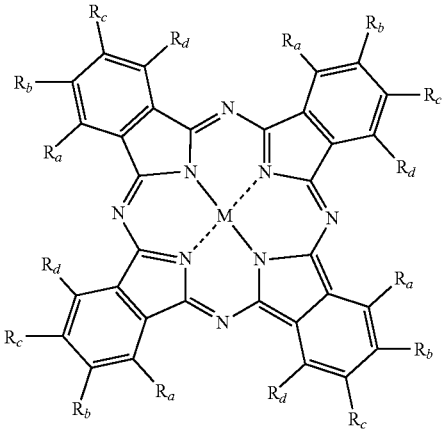

(III)

wherein M represents two hydrogen atoms, two monovalent metal atoms, a divalent metal atom, or substituted metal atoms containing a trivalent or tetravalent metal atom, plural R$_a$, R$_b$, R$_c$ and R$_d$ are each independently a hydrogen atom, a halogen atom, a hydroxyl group, a carboxyl group, a nitro group, an amino group, an amide group, an imide group, a cyano group, a silyl group, -L$^1$, —S-L$^2$, —SS-L$^2$, —SO$_2$-L$^3$ or —N=N-L$^4$, or at least one combination of R$_a$ and R$_b$, R$_b$ and R$_c$, and R$_c$ and R$_d$ is bonded to form at least one group selected from the group consisting of groups represented by the following formulas (A) to (H), and at least one of R$_a$, R$_b$, R$_c$ and R$_d$ bonded to the same aromatic ring is not a hydrogen atom, the amino group, the amide group, the imide group and the silyl group may have a substituent L defined in the formula (I) as stated in the item [5], L$^1$ has the same meaning as that of L$^1$ defined in the formula (I), L$^2$ is a hydrogen atom or any one of L$^a$ to L$^e$ defined in the formula (I), L$^3$ is a hydroxyl group or any one of the above L$^a$ to L$^e$, and L$^4$ is any one of the above L$^a$ to L$^e$;

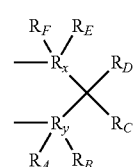

(A)

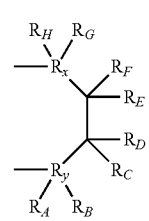

(B)

-continued (C)
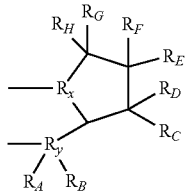

(D)
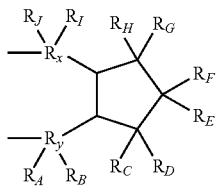

(E)
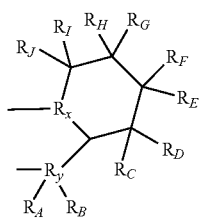

(F)
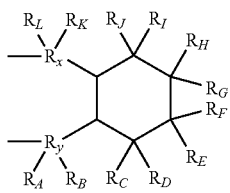

(G)
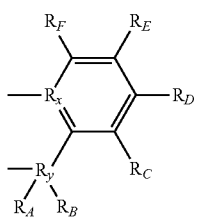

(H)
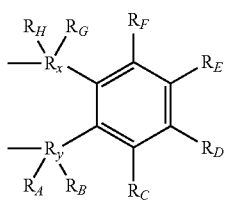

wherein a combination of $R_x$ and $R_y$ is a combination of $R_a$ and $R_b$, $R_b$ and $R_c$, or $R_c$ and $R_d$, and plural $R_A$ to $R_L$ are each independently a hydrogen atom, a halogen atom, a hydroxyl group, a nitro group, an amino group, an amide group, an imide group, a cyano group, a silyl group, $-L^1$, $-S-L^2$, $-SS-L^2$, $-SO_2-L^3$ or $-N=N-L^4$ ($L^1$ to $L^4$ have the same meanings as those of $L^1$ to $L^4$ defined in the formula (III)), and the amino group, the amide group, the imide group and the silyl group may have the substituent L.

[7] The optical filter as stated in the item [6], wherein M in the formula (III) is a divalent transition metal, a halide of a trivalent or tetravalent metal or an oxide of a tetravalent metal, each of said metals belonging to the periodic table Group 5 to Group 11 and belonging to the periodic table Period 4 to Period 5.

[8] The optical filter as stated in any one of the items [1] to [7], wherein the cyanine-based compound (B-2) is a compound represented by any one of the following formulas (IV-1) to (IV-3):

(IV-1)
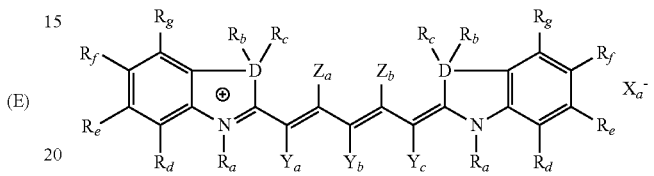

(IV-2)
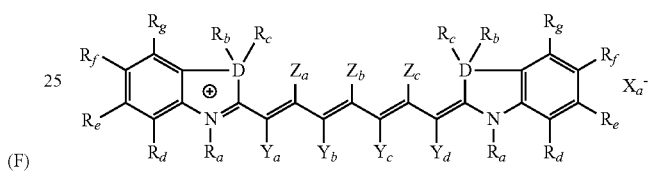

(IV-3)
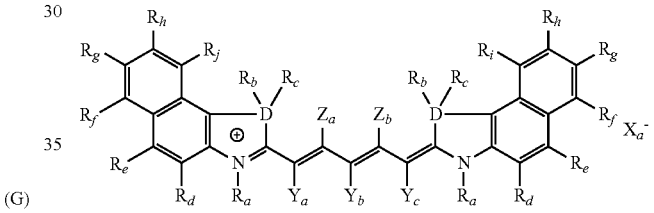

wherein $X_a^-$ is a monovalent anion, plural D are each independently a carbon atom, a nitrogen atom, an oxygen atom or a sulfur atom, plural $R_a$, $R_b$, $R_c$, $R_d$, $R_e$, $R_f$, $R_g$, $R_h$ and $R_i$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$, or at least one combination of $R_b$ and $R_c$, $R_d$ and $R_e$, $R_e$ and $R_f$, $R_f$ the $R_g$, $R_g$ and $R_h$, and $R_h$ and $R_i$ is bonded to form at least one group selected from the group consisting of groups represented by the following formulas (A) to (H), the amino group, the amide group, the imide group and the silyl group may have a substituent L defined in the formula (I) as stated in the item [5], $L^1$ has the same meaning as that of $L^1$ defined in the formula (I), $L^2$ is a hydrogen atom or any one of $L^a$ to $L^e$ defined in the formula (I), $L^3$ is a hydrogen atom or any one of the above $L^a$ to $L^e$, $L^4$ is any one of the above $L^a$ to $L^e$, and $Z_a$ to $Z_c$ and $Y_a$ to $Y_d$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$ ($L^1$ to $L^4$ have the same meanings as those of $L^1$ to $L^4$ in the above $R_a$ to $R_i$), or neighboring two Z or neighboring two Y are bonded to each other to form an alicyclic hydrocarbon group of 5- to 6-membered ring, which may contain at least one of a nitrogen atom, an oxygen atom and a sulfur atom, or neighboring two Z or neighboring two Y are bonded to each other to form an aromatic hydrocarbon group of 6 to 14 carbon atoms, or neighboring two Z or neighboring two Y are bonded to each other to form a heteroaromatic hydrocarbon group of 3 to 14 carbon atoms, which contains at least one of a nitrogen atom, an oxygen atom and a sulfur atom, and these alicyclic hydrocarbon group, aromatic hydrocarbon group and heteroaromatic hydrocarbon group may have an aliphatic hydrocarbon group of 1 to 9 carbon atoms or a halogen atom;

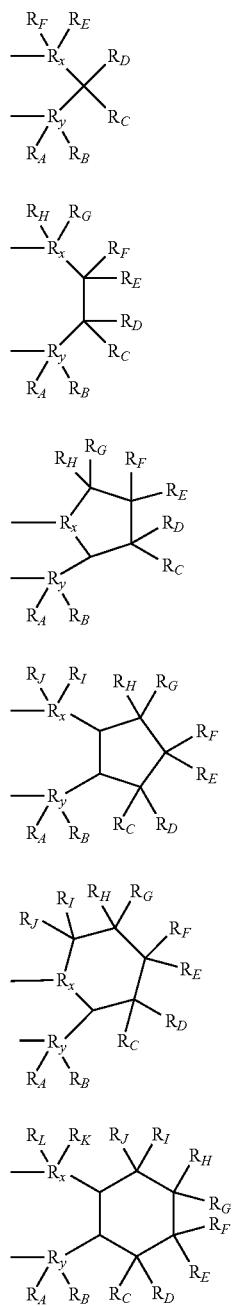

(A)

(B)

(C)

(D)

(E)

(F)

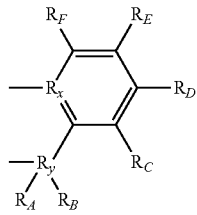

(G)

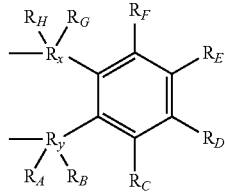

(H)

wherein a combination of $R_x$ and $R_y$ is a combination of $R_b$ and $R_c$, $R_d$ and $R_e$, $R_e$ and $R_f$, $R_f$ and $R_g$, $R_g$ and $R_h$, or $R_h$ and $R_i$, and plural $R_A$ to $R_L$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$ ($L^1$ to $L^4$ have the same meanings as those of $L^1$ to $L^4$ defined in the formulas (IV-1) to (IV-3)), and the amino group, the amide group, the imide group and the silyl group may have the substituent L.

[9] The optical filter as stated in any one of the items [1] to [8], which has a resin substrate containing the near-infrared absorbing dye and a resin.

[10] The optical filter as stated in the item [9], wherein the content of the whole near-infrared absorbing dye is 0.01 to 5.0 parts by weight based on 100 parts by weight of the resin.

[11] The optical filter as stated in the item [9] or [10] wherein the resin is at least one resin selected from the group consisting of a cyclic polyolefin-based resin, an aromatic polyether-based resin, a polyimide-based resin, a fluorene polycarbonate-based resin, a fluorene polyester-based resin, a polycarbonate-based resin, a polyamide-based resin, a polyarylate-based resin, a polysulfone-based resin, a polyether sulfone-based resin, a polyparaphenylene-based resin, a polyamidoimide-based resin, a polyethylene naphthalate-based resin, a fluorinated aromatic polymer-based resin, a (modified) acrylic resin, an epoxy-based resin, an allyl ester-based curing type resin and a silsesquioxane-based ultraviolet curing resin.

[12] An optical filter containing a squarylium-based compound (A) and a compound which absorbs fluorescence of the squarylium-based compound (A).

[13] The optical filter as stated in any one of the items [1] to [12], which further contains at least one near-ultraviolet absorbing agent selected from the group consisting of an azomethine-based compound, an indole-based compound, a benzotriazole-based compound and a triazine-based compound.

[14] The optical filter as stated in any one of the items [1] to [13], which is for a solid-state image pickup device.

[15] A solid-state image pickup device equipped with the optical filter as stated in any one of the items [1] to [13].

[16] A camera module equipped with the optical filter as stated in any one of the items [1] to [13].

Effect of the Invention

According to the present invention, an optical filter which generates little scattered light during light absorption and is excellent in transmittance property can be provided.

BRIEF DESCRIPTION OF DRAWINGS

FIG. 1(a) is a sectional schematic view showing an example of a conventional camera module.

EMBODIMENT FOR CARRYING OUT THE INVENTION

Figure 1:
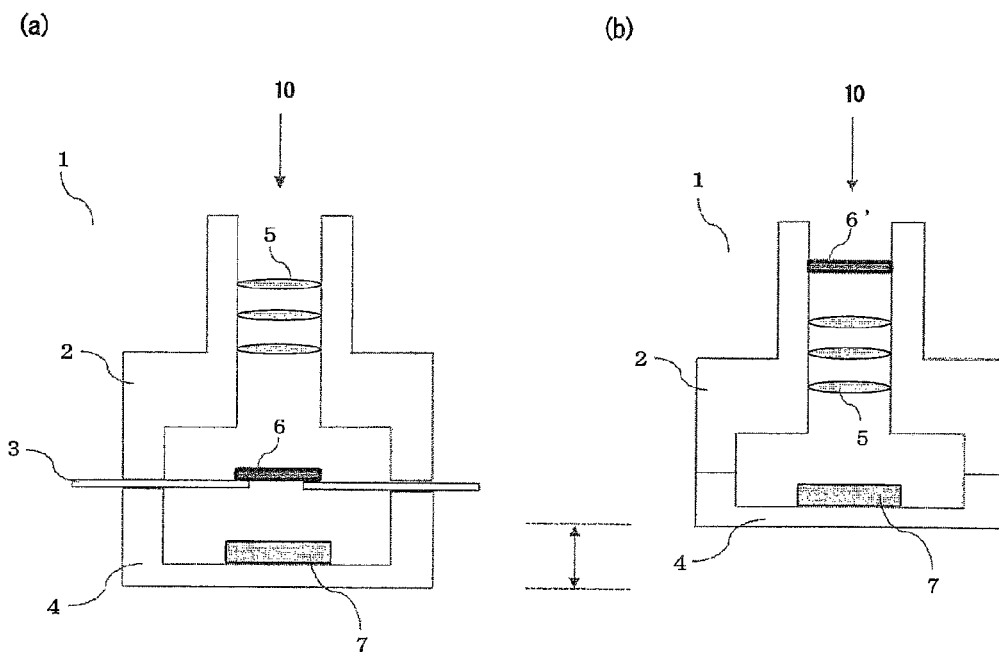
FIG. 1 (b) is a sectional schematic view showing an example of a camera module using an optical filter 6' of the present invention.

The present invention is specifically described hereinafter.

The optical filter of the present invention contains a squarylium-based compound (A) and a compound which absorbs or quenches fluorescence of the squarylium-based compound (A). Specifically, the optical filter of the present invention contains a near-infrared absorbing dye containing a squarylium-based compound (A) and at least one compound (B) selected from the group consisting of a phthalocyanine-based compound (B-1) and a cyanine-based compound (B-2), and the optical filter preferably has a resin substrate containing the near-infrared absorbing dye and a resin. Further, the optical filter of the present invention may have a near-infrared reflecting film.

[Resin Substrate]

The resin substrate may be a single layer substrate or a multilayer substrate, and contains, as near-infrared absorbing dyes, a squarylium-based compound (A) and at least one compound (B) selected from a phthalocyanine-based compound (B-1) and a cyanine-based compound (B-2). The resin substrate desirably has an absorption maximum in the wavelength range of 600 to 800 nm. When the absorption maximum wavelength of the substrate is in such a range, the substrate can cut near-infrared rays selectively and efficiently.

When such a resin substrate is used for an optical filter such as a near-infrared cut filter, an absolute value of a difference between a wavelength value (Xa) at which the transmittance measured in the perpendicular direction to the optical filer becomes 50% in the wavelength range of 560 to 800 nm and a wavelength value (Xb) at which the transmittance measured at an angle of 30° to the perpendicular direction to the optical filter becomes 50% in the same wavelength range becomes small, and an optical filter having a small dependence of the absorption wavelength on the angle of incidence and having a wide viewing angle can be obtained. The absolute value of a difference between (Xa) and (Xb) is preferably less than 20 nm, more preferably less than 15 nm, particularly preferably less than 10 nm.

Depending upon the intended use of a camera module, the mean transmittance of a resin substrate containing the squarylium-based compound (A) and the compound (B) and having a thickness of 100 μm sometimes needs to be not less than 50%, preferably not less than 65%, in the so-called visible region of a wavelength of 400 to 700 nm.

The thickness of the resin substrate can be properly selected according to the desired use and is not specifically restricted. However, the thickness is preferably adjusted so that the substrate may have such improvement in the incident angle dependence as previously mentioned, and it is more preferably 30 to 250 μm, still more preferably 40 to 200 μm, particularly preferably 50 to 150 μm.

When the thickness of the resin substrate is in the above range, the optical filter using the substrate can be reduced in size and weight, so that it can be preferably applied to various uses such as a solid-state image pickup device. Especially when the resin substrate is used for a lens unit of a camera module or the like, lowering of height of the lens unit can be realized, so that such use is preferable.

The resin substrate can further contain at least one near-ultraviolet absorbing agent selected from the group consisting of an azomethine-based compound, an indole-based compound, a benzotriazole-based compound and a triazine-based compound, in addition to the near-infrared absorbing dye containing the squarylium-based compound (A) and the compound (B). By the use of such a resin substrate, an optical filter having a small dependence on the incident angle even in the near-ultraviolet wavelength region and having a wide viewing angle can be obtained.

The near-infrared absorbing dye and the near-ultraviolet absorbing agent may be contained in the same layer or may be contained in different layers. When they are contained in the same layer, there can be mentioned, for example, an embodiment wherein the near-infrared absorbing dye and the near-ultraviolet absorbing agent are both contained in the same resin substrate. When they are contained in different layers, there can be mentioned, for example, an embodiment wherein a layer containing the near-ultraviolet absorbing agent is laminated on a resin substrate containing the near-infrared absorbing dye.

The near-infrared absorbing dye and the near-ultraviolet absorbing agent are more preferably contained in the same layer, and in such a case, control of the content ratio between the near-infrared absorbing dye and the near-ultraviolet absorbing agent can be made more easily than in the case where they are contained in different layers.

<Near-Infrared Absorbing Dye>

(1) Squarylium-Based Compound (A)

The squarylium-based compound (A) is preferably a compound represented by the following formula (I) (also referred to as a "compound (I)" hereinafter) or a compound represented by the following formula (II) (also referred to as a "compound (II)" hereinafter).

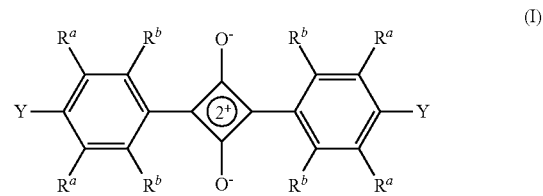

In the formula (I), $R^a$, $R^b$ and Y satisfy the following condition (i) or (ii).

(i) Plural $R^a$ are each independently a hydrogen atom, a halogen atom, a sulfo group, a hydroxyl group, a cyano group, a nitro group, a carboxyl group, a phosphoric acid group, -L¹ or a —NR$^e$R$^f$ group (R$^e$ and R$^f$ are each independently a hydrogen atom, -L$^a$, -L$^b$, -L$^c$, -L$^d$ or -L$^e$), plural R$^b$ are each independently a hydrogen atom, a halogen atom, a sulfo group, a hydroxyl group, a cyano group, a nitro group, a carboxyl group, a phosphoric acid group, -L¹ or a —NR$^g$R$^h$ group (R$^g$ and R$^h$ are each independently a hydrogen atom, -L$^a$, -L$^b$, -L$^c$, -L$^d$, -L$^e$ or a —C(O)R$^i$ group (R$^i$ is -L$^a$, -L$^b$, -L$^c$, -L$^d$ or -L$^e$)), plural Y are each independently a —NR$^j$R$^k$ group (R$^j$ and R$^k$ are each independently a hydrogen atom, -L$^a$, -L$^b$, -L$^c$, -L$^d$ or -L$^e$), L¹ is (L$^a$) an aliphatic hydrocarbon group of 1 to 9 carbon atoms, which may have a substituent L, (L$^b$) a halogen-substituted alkyl group of 1 to 9 carbon atoms, which may have a substituent L, (L$^c$) an alicyclic hydrocarbon group of 3 to 14 carbon atoms, which may have a substituent L, (L$^d$) an aromatic hydrocarbon group of 6 to 14 carbon atoms, which may have a substituent L, (L$^e$) a heterocyclic group of 3 to 14 carbon atoms, which may have a substituent L, (L$^f$) an alkoxy group of 1 to 9 carbon atoms, which may have a substituent L, (L$^g$) an acyl group of 1 to 9 carbon atoms, which may have a substituent L, or (L$^h$) an alkoxycarbonyl group of 1 to 9 carbon atoms, which may have a substituent L, the substituent L is at least one kind selected from the group consisting of an aliphatic hydrocarbon group of 1 to 9 carbon atoms, a halogen-substituted alkyl group of 1 to 9 carbon atoms, an alicyclic hydrocarbon group of 3 to 14 carbon atoms, an aromatic hydrocarbon group of 6 to 14 carbon atoms and a heterocyclic group of 3 to 14 carbon atoms, and the above L$^a$ to L$^h$ may further have at least one atom or group selected from the group consisting of a halogen atom, a sulfo group, a hydroxyl group, a cyano group, a nitro group, a carboxyl group, a phosphoric acid group and an amino group. The total number of carbon atoms of each of L$^a$ to L$^h$ including a substituent is preferably 50 or less, more preferably 40 or less, particularly preferably 30 or less. When the number of carbon atoms is larger than the upper limit of this range, synthesis of a dye sometime becomes difficult, and the absorption intensity per unit weight tends to be lowered.

(ii) At least one of two R$^a$ on one benzene ring and Y on the same benzene ring are bonded to each other to form a heterocyclic ring of 5 or 6 constituent atoms containing at least one nitrogen atom, and the heterocyclic ring may have a substituent, and R$^b$ and R$^a$ which does not take part in the formation of the heterocyclic ring have the same meanings as those of R$^b$ and R$^a$ in the condition (i), respectively.

Examples of the aliphatic hydrocarbon groups of 1 to 9 carbon atoms in the above L$^a$ and L include alkyl groups, such as methyl group (Me), ethyl group (Et), n-propyl group (n-Pr), isopropyl group (i-Pr), n-butyl group (n-Bu), sec-butyl group (s-Bu), tert-butyl group (t-Bu), pentyl group, hexyl group, octyl group and nonyl group; alkenyl groups, such as vinyl group, 1-propenyl group, 2-propenyl group, butenyl group, 1,3-butadienyl group, 2-methyl-1-propenyl group, 2-pentenyl group, hexenyl group and octenyl group; and alkynyl groups, such as ethynyl group, propynyl group, butynyl group, 2-methyl-1-propynyl group, hexynyl group and octynyl group.

Examples of the halogen-substituted alkyl groups of 1 to 9 carbon atoms in the above L$^b$ and L include trichloromethyl group, trifluoromethyl group, 1,1-dichloroethyl group, pentachloroethyl group, pentafluoroethyl group, heptachloropropyl group and heptafluoropropyl group.

Examples of the alicyclic hydrocarbon groups of 3 to 14 carbon atoms in the above L$^c$ and L include cycloalkyl groups, such as cyclobutyl group, cyclopentyl group, cyclohexyl group, cycloheptyl group, cyclooctyl group, norbornane group and adamantane group.

Examples of the aromatic hydrocarbon groups of 6 to 14 carbon atoms in the above L$^d$ and L include phenyl group, tolyl group, xylyl group, mesityl group, cumenyl group, 1-naphthyl group, 2-naphthyl group, anthracenyl group, phenanthryl group, acenaphthyl group, phenalenyl group, tetrahydronaphthyl group, indanyl group and biphenylyl group.

Examples of the heterocyclic groups of 3 to 14 carbon atoms in the above L$^e$ and L include groups composed of heterocyclic rings such as furan, thiophene, pyrrole, pyrazole, imidazole, triazole, oxazole, oxadiazole, triazole, thiadiazole, indole, indoline, indolenine, benzofuran, benzothiophene, carbazole, dibenzofuran, dibenzothiophene, pyridine, pyrimidine, pyrazine, pyridazine, quinoline, isoquinoline, acridine and phenazine.

Examples of the alkoxy groups of 1 to 9 carbon atoms in the above L$^f$ include methoxy group, ethoxy group, propoxy group, isopropoxy group, butoxy group, 2-methoxyethoxy group, pentyloxy group, hexyloxy group, octyloxy group, methoxymethyl group, methoxyethyl group, methoxypropyl group, methoxybutyl group, methoxyhexyl group, ethoxyethyl group, ethoxyethyl group, ethoxypropyl group, ethoxybutyl group, ethoxyhexyl group, propoxymethyl group, propoxypropyl group, propoxyhexyl group and butoxyethyl group.

Examples of the acyl groups of 1 to 9 carbon atoms in the above L$^g$ include acetyl group, propionyl group, butyryl group, isobutyryl group, valeryl group, isovaleryl group and benzoyl group.

Examples of the alkoxycarbonyl groups of 1 to 9 carbon atoms in the above L$^h$ include methoxycarbonyl group, ethoxycarbonyl group, propoxycarbonyl group, isopropoxycarbonyl group, butoxycarbonyl group, 2-methoxyethoxycarbonyl group, pentyloxycarbonyl group, hexyloxycarbonyl group and octyloxycarbonyl group.

As the L$^a$, the aforesaid "aliphatic hydrocarbon groups of 1 to 9 carbon atoms" and the aliphatic hydrocarbon groups further having the substituent L can be mentioned. Of these, preferred are methyl group, ethyl group, n-propyl group, isopropyl group, n-butyl group, sec-butyl group, tert-butyl group, pentyl group, hexyl group, octyl group, 4-phenylbutyl group and 2-cyclohexylethyl, and more preferred are methyl group, ethyl group, n-propyl group, isopropyl group, n-butyl group, sec-butyl group and tert-butyl group.

As the L$^b$, the aforesaid "halogen-substituted alkyl groups of 1 to 9 carbon atoms" and the halogen-substituted alkyl groups further having the substituent L can be mentioned. Of these, preferred are trichloromethyl group, pentachloroethyl group, trifluoromethyl group, pentafluoroethyl group, 5-cyclohexyl-2,2,3,3-tetrafluoropentyl group and 2,2-dichloro-4-phenoxybutyl group, and more preferred are trichloromethyl group, pentachloroethyl group, trifluoromethyl group and pentafluoroethyl group.

As the L$^c$, the aforesaid "alicyclic hydrocarbon groups of 3 to 14 carbon atoms" and the alicyclic hydrocarbon groups further having the substituent L can be mentioned. Of these, preferred are cyclobutyl group, cyclopentyl group, cyclohexyl group, 4-ethylcyclohexyl group, cyclooctyl group and 4-phenylcycloheptyl group, and more preferred are cyclopentyl group, cyclohexyl group and 4-ethylcyclohexyl group.

As the $L^d$, the aforesaid "aromatic hydrocarbon groups of 6 to 14 carbon atoms" and the aromatic hydrocarbon groups further having the substituent L can be mentioned. Of these, preferred are phenyl group, 1-naphthyl group, 2-naphthyl group, tolyl group, xylyl group, mesytyl group, cumenyl group, 3,5-di-tert-butylphenyl group, 4-cyclopentylphenyl group, 2,3,6-triphenylphenyl group, 2,3,4,5,6-pentaphenylphenyl group and 4-α-cumylphenoxy group, and more preferred are phenyl group, tolyl group, xylyl group, mesytyl group, cumenyl group, 2,3,4,5,6-pentaphenylphenyl group and 4-α-cumylphyenoxy group.

As the $L^e$, the aforesaid "heterocyclic groups of 3 to 14 carbon atoms" and the heterocyclic groups further having the substituent L can be mentioned. Of these, preferred are groups composed of furan, thiophene, pyrrole, indole, indoline, indolenine, benzofuran and benzothiophene, and more preferred are groups composed of furan, thiophene and pyrrole.

As the $L^f$, the aforesaid "alkoxy groups of 1 to 9 carbon atoms" and the alkoxy groups further having the substituent L can be mentioned. Of these, preferred are methoxy group, ethoxy group, propoxy group, isopropoxy group, butoxy group, 2-methoxyethoxy group, methoxymethyl group, methoxyethyl group, 2-phenylethoxy group, 3-cyclohexylpropoxy group, pentyloxy group, hexyloxy group and octyloxy group, and more preferred are methoxy group, ethoxy group, propoxy group, isopropoxy group and butoxy group.

As the $L^g$, the aforesaid "acyl groups of 1 to 9 carbon atoms" and the acyl groups further having the substituent L can be mentioned. Of these, preferred are acetyl group, propionyl group, butyryl group, isobutyryl group, benzoyl group and 4-propylbenzoyl group, and more preferred are acetyl group, propionyl group and benzoyl group.

As the $L^h$, the aforesaid "alkoxycarbonyl groups of 1 to 9 carbon atoms" and the alkoxycarbonyl groups further having the substituent L can be mentioned. Of these, preferred are methoxycarbonyl group, ethoxycarbonyl group, propoxycarbonyl group, isopropoxycarbonyl group, butoxycarbonyl group, 2-trifluoromethylethoxycarbonyl group and 2-phenylethoxycarbonyl group, and more preferred are methoxycarbonyl group and ethoxycarbonyl group.

The $L^a$ to $L^h$ may further have at least one atom or group selected from the group consisting of a halogen atom, a sulfo group, a hydroxyl group, a cyano group, a nitro group, a carboxyl group, a phosphoric acid group and an amino group. Examples thereof include 4-sulfobutyl group, 4-cyanobutyl group, 5-carboxypentyl group, 5-aminopentyl group, 3-hydroxypropyl group, 2-phosphorylethyl group, 6-amino-2,2-dichlorohexyl group, 2-chloro-4-hdyroxybutyl group, 2-cyanocyclobutyl group, 3-hydroxycyclopentyl group, 3-carboxycyclopentyl group, 4-aminocyclohexyl group, 4-hydroxycyclohexyl group, 4-hydroxyphenyl group, pentafluorophenyl group, 2-hydroxynaphthyl group, 4-aminophenyl group, 2,3,4,5,6-pentafluorophenyl group, 4-nitrophenyl group, group composed of 3-methylpyrrole, 2-hydroxyethoxy group, 3-cyanopropoxy group, 4-fluorobenzoyl group, 2-hydroxyethoxycarbonyl group and 4-cyanobutoxycarbonyl group.

The $R^a$ in the above condition (i) is preferably a hydrogen atom, a chlorine atom, a fluorine atom, a methyl group, an ethyl group, a n-propyl group, an isopropyl group, a hydroxyl group, a n-butyl group, a sec-butyl group, a tert-butyl group, a cyclohexyl group, a phenyl group, an amino group, a dimethylamino group or a nitro group, and is more preferably a hydrogen atom, a chlorine atom, a fluorine atom, a methyl group, an ethyl group, a n-propyl group, an isopropyl group or a hydroxyl group.

The $R^b$ is preferably a hydrogen atom, a chlorine atom, a fluorine atom, a methyl group, an ethyl group, a n-propyl group, an isopropyl group, a n-butyl group, a sec-butyl group, a tert-butyl group, a cyclohexyl group, a phenyl group, an amino group, a dimethylamino group, a cyano group, a nitro group, a hydroxyl group, an acetylamino group, a propionylamino group, a N-methylacetylamino group, a trifluoromethanoylamino group, a pentafluoroethanoylamino group, a t-butanoylamino group or a cyclohexanoylamino group, and is more preferably a hydrogen atom, a chlorine atom, a fluorine atom, a methyl group, an ethyl group, a n-propyl group, an isopropyl group, a dimethylamino group, a nitro group, a hydroxyl group, an acetylamino group, a propionylamino group, a trifluoromethanoylamino group, a pentafluoroethanoylamino group, a t-butanoylamino group or a cyclohexanoylamino group.

The Y is preferably an amino group, a methylamino group, a dimethylamino group, a diethylamino group, a di-n-propylamino group, a diisopropylamino group, a di-n-butylamino group, a di-t-butylamino group, a N-ethyl-N-methylamino group or a N-cyclohexyl-N-methylamino group, and is more preferably a dimethylamino group, a diethylamino group, a di-n-propylamino group, a diisopropylamino group, a di-n-butylamino group or a di-t-butylamino group.

Examples of the heterocyclic rings of 5 or 6 constituent atoms containing at least one nitrogen atom, which are formed by bonding of at least one of two $R^a$ on one benzene ring and Y on the same benzene ring to each other, in the condition (ii) of the aforesaid formula (I) include pyrrolidine, pyrrole, imidazole, pyrazole, piperidine, pyridine, piperazine, pyridazine, pyrimidine and pyrazine. Of these heterocyclic rings, preferred are heterocyclic rings wherein one atom adjacent to a carbon atom that constitutes the heterocyclic ring and constitutes the benzene ring is a nitrogen atom, and more preferred is pyrrolidine.

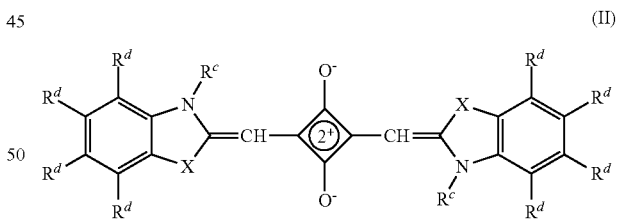

(II)

In the formula (II), X is O, S, Se, N—$R^c$ or C—$R^d R^d$, plural $R^c$ are each independently a hydrogen atom, -$L^a$, -$L^b$, -$L^c$, -$L^d$ or -$L^e$, plural $R^d$ are each independently a hydrogen atom, a halogen atom, a sulfo group, a hydroxyl group, a cyano group, a nitro group, a carboxyl group, a phosphoric acid group, -$L^1$ or a —$NR^e R^f$ group, and neighboring $R^d$ and $R^d$ may be bonded to each other to form a ring which may have a substituent, and $L^a$ to $L^e$, $L^1$, $R^e$ and $R^f$ have the same meanings as those of $L^a$ to $L^e$, $L^1$, $R^e$ and $R^f$ defined in the formula (I).

$R^c$ in the formula (II) is preferably a hydrogen atom, a methyl group, an ethyl group, a n-propyl group, an isopropyl group, a n-butyl group, a sec-butyl group, a tert-butyl group, a n-pentyl group, a n-hexyl group, a cyclohexyl group, a phenyl group, a trifluoromethyl group or a pentafluoroethyl group, and is more preferably a hydrogen atom, a methyl group, an ethyl group, a n-propyl group or an isopropyl group.

$R^d$ in the formula (II) is preferably a hydrogen atom, a chlorine atom, a fluorine atom, a methyl group, an ethyl group, a n-propyl group, an isopropyl group, a n-butyl group, a sec-butyl group, a tert-butyl group, a n-pentyl group, a n-hexyl group, a cyclohexyl group, a phenyl group, a methoxy group, a trifluoromethyl group, a pentafluoroethyl group or a 4-aminocyclohexyl group, and is more preferably a hydrogen atom, a chlorine atom, a fluorine atom, a methyl group, an ethyl group, a n-propyl group, an isopropyl group, a trifluoromethyl group or a pentafluoroethyl group.

The above X is preferably O, S, Se, N-Me, N-Et, $CH_2$, $C-Me_2$ or $C-Et_2$, and is more preferably S, $C-Me_2$ or $C-Et_2$.

In the formula (II), neighboring $R^d$ and $R^d$ may be bonded to each other to form a ring. Examples of such rings include benzoindolenine ring, α-naphthoimidazole ring, β-naphthoimidazole ring, α-naphthooxazole ring, β-naphthooxazole ring, α-naphthothiazole ring, β-naphthothiazole ring, α-naphthoselenazole ring and β-naphthoselenazole ring.

Structures of the compound (I) and the compound (II) can be represented also by such descriptive means as have resonance structures, such as the following formula (I-2) and the following formula (II-2), in addition to the descriptive means such as the following formula (I-1) and the following formula (II-1). That is to say, a difference between the following formula (I-1) and the following formula (I-2) and a difference between the following formula (II-1) and the following formula (II-2) are only descriptive means for the structures, and both of them represent the same compound. In the present invention, the structures of the squarylium-based compounds are represented by descriptive means such as the following formula (I-1) and the following formula (II-1) unless otherwise noted.

The structures of the compound (I) and the compound (II) are not specifically restricted provided that the compound (I) and the compound (II) satisfy the requirements of the formula (I) and the formula (II), respectively, and for example, when the structures of them are represented by the formula (I-1) and the formula (II-1), the substituents which are bonded to the central 4-membered ring and are on the right-hand side and the left-hand side thereof may be the same or different, but they are preferably the same as each other because of ease of synthesis. For example, the compound represented by the following formula (I-3) and the compound represented by the following formula (I-4) can be regarded as identical with each other.

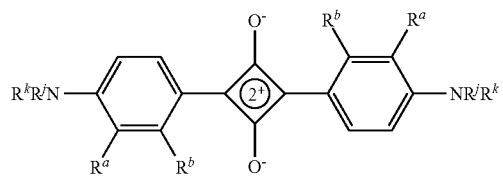

(I-3)

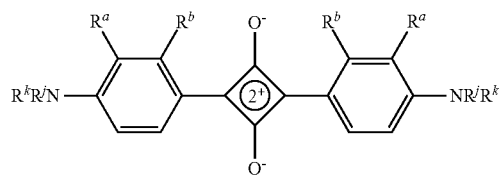

(I-4)

Specific examples of the compounds (I) and the compounds (II) include compounds (a-1) to (a-36) described in the following Table 1 to 3, which have basic skeletons represented by the following (I-A) to (I-H).

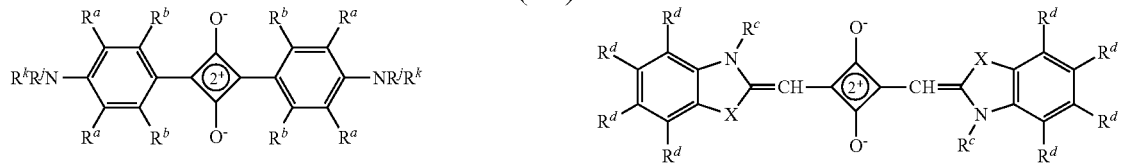

(I-1)

(II-1)

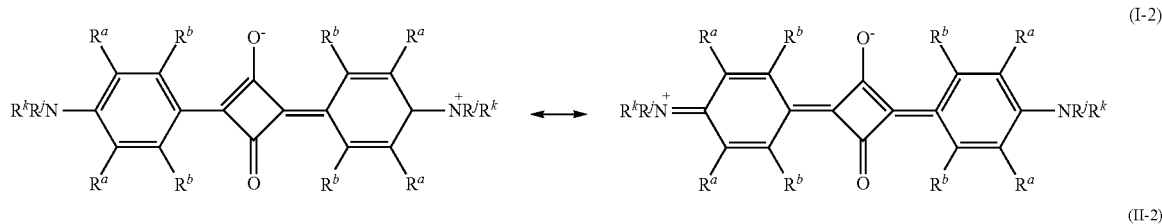

(I-2)

(II-2)

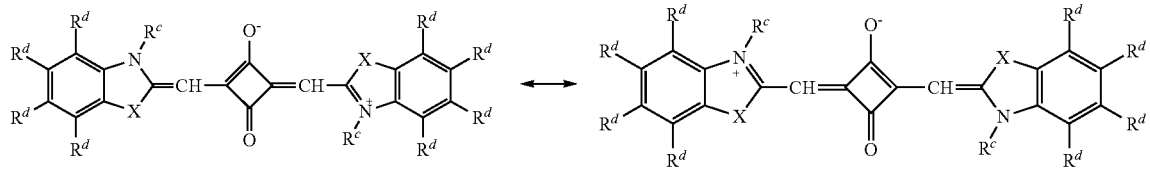

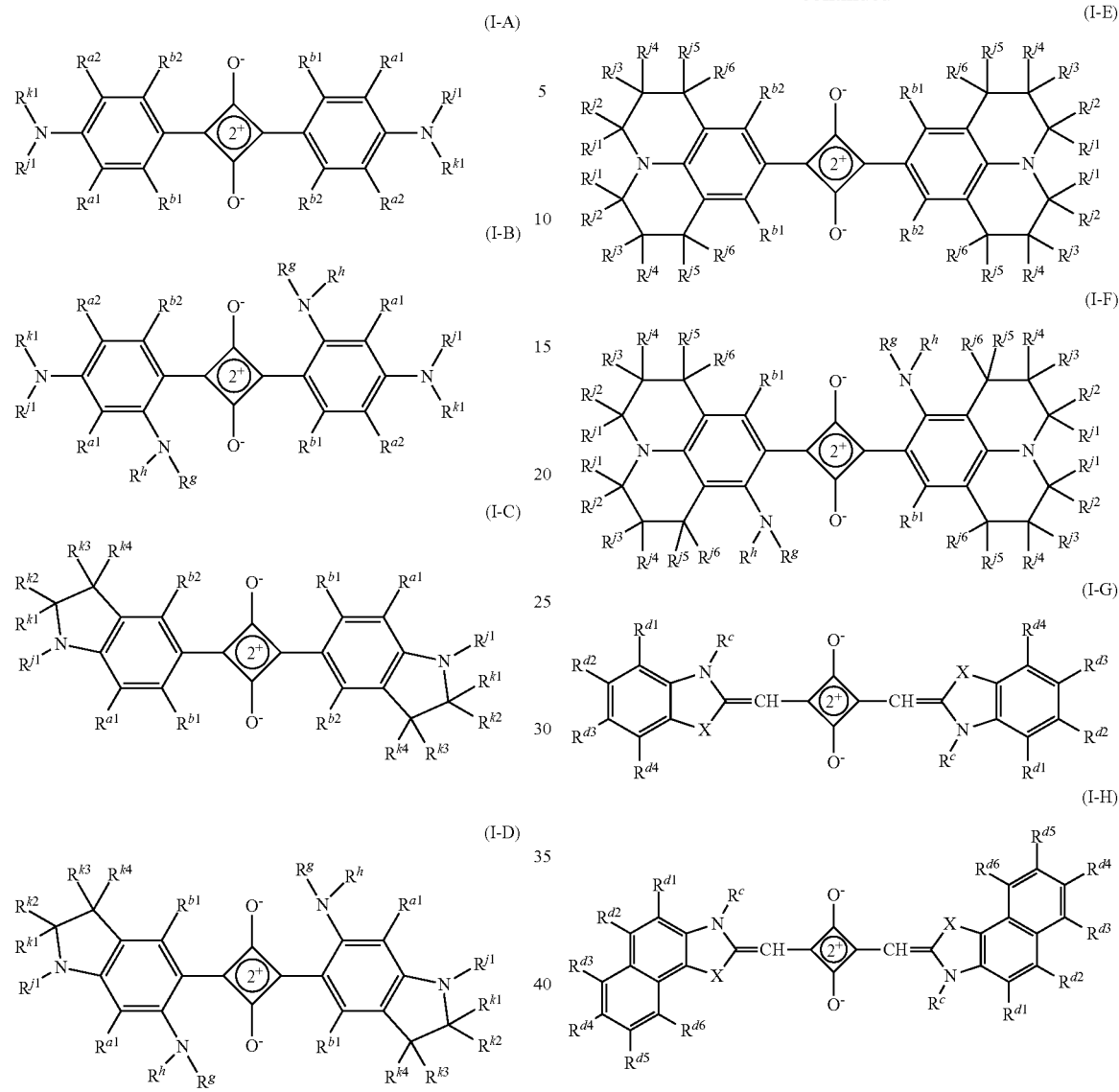

TABLE 1-continued

| Compound | Basic skeleton | $R^{a1}$ | $R^{a2}$ | $R^{b1}$ | $R^{b2}$ | $R^g$ | $R^h$ | $R^{j1}$ | $R^{k1}$ | $R^{k2}$ | $R^{k3}$ | $R^{k4}$ |
|---|---|---|---|---|---|---|---|---|---|---|---|---|
| (a-8) | | H | H | H | — | H | C(=O)-t-Bu | n-Bu | n-Bu | — | — | — |
| (a-9) | | Me | H | H | — | H | C(=O)-CF$_3$ | i-Pr | i-Pr | — | — | — |
| (a-10) | (I-C) | H | — | OH | H | — | — | Me | H | H | H | H |
| (a-11) | | Me | — | Me | H | — | — | Me | Me | H | Me | Me |
| (a-12) | | H | — | OH | H | — | — | Me | Me | H | Me | Me |
| (a-13) | | H | — | H | H | — | — | n-Bu | H | H | Et | H |
| (a-14) | | H | — | OH | H | — | — | cyclohexyl-CH$_2$ | Me | H | Me | Me |
| (a-15) | (I-D) | H | — | H | — | H | H | Me | H | H | Me | Me |
| (a-16) | | H | — | H | — | H | C(=O)-Me | Me | Me | H | Me | Me |
| (a-17) | | Et | — | H | — | H | C(=O)-CF$_3$ | n-Bu | H | H | H | H |
| (a-18) | | H | — | H | — | H | C(=O)-cyclohexyl | Me | Me | H | Me | Me |
| (a-19) | | Me | — | H | — | H | C(=O)-CF$_2$-CF$_3$ | Et | Me | H | Me | Me |
| (a-20) | | H | — | H | — | H | C(=O)-t-Bu | Me | Me | H | Me | Me |

TABLE 2

| Compound | Basic skeleton | $R^{b1}$ | $R^{b2}$ | $R^g$ | $R^h$ | $R^{j1}$ | $R^{j2}$ | $R^{j3}$ | $R^{j4}$ | $R^{j5}$ | $R^{j6}$ |
|---|---|---|---|---|---|---|---|---|---|---|---|
| (a-21) | (I-E) | OH | H | — | — | H | H | H | H | H | H |
| (a-22) | | OH | H | — | — | H | H | H | H | Me | Me |
| (a-23) | | OH | H | — | — | Me | H | Me | H | Me | Me |
| (a-24) | | OH | Me | — | — | H | H | H | H | n-Bu | n-Bu |
| (a-25) | (I-F) | H | — | H | C(=O)-Me | H | H | H | H | Me | Me |
| (a-26) | | H | — | Me | C(=O)-Me | Me | H | Me | H | Me | Me |

TABLE 2-continued

| Compound | Basic skeleton | $R^{b1}$ | $R^{b2}$ | $R^g$ | $R^h$ | $R^{j1}$ | $R^{j2}$ | $R^{j3}$ | $R^{j4}$ | $R^{j5}$ | $R^{j6}$ |
|---|---|---|---|---|---|---|---|---|---|---|---|
| (a-27) | | H | — | H | ![O=C-CF3 acyl group] | H | H | Me | Me | Et | Et |
| (a-28) | | H | — | H | ![O=C-t-Bu acyl group] | H | H | H | H | Me | Me |

TABLE 3

| Compound | Basic skeleton | X | $R^c$ | $R^{d1}$ | $R^{d2}$ | $R^{d3}$ | $R^{d4}$ | $R^{d5}$ | $R^{d6}$ |
|---|---|---|---|---|---|---|---|---|---|
| (a-29) | (I-G) | $C(CH_3)_2$ | Et | H | H | H | H | — | — |
| (a-30) | | $CH_2$ | n-Bu | H | H | F | H | — | — |
| (a-31) | | S | Me | H | Me | Me | H | — | — |
| (a-32) | | O | Et | H | $CF_3$ | $CF_3$ | H | — | — |
| (a-33) | (I-H) | $C(CH_3)_2$ | i-Pr | H | H | H | H | H | H |
| (a-34) | | S | n-Bu | H | H | H | $CF_3$ | $CF_3$ | H |
| (a-35) | | $C(CH_3)_2$ | $CF_2CF_3$ | H | H | H | H | —OMe | H |
| (a-36) | | $C(CH_3)_2$ | Et | H | H | H | Me | Me | H |

It is enough just to synthesize the compound (I) and the compound (II) by generally known processes, and for example, they can be synthesized referring to the processes described in Japanese Patent Laid-Open Publication No. 1989-228960, Japanese Patent Laid-Open Publication No. 2001-40234, Japanese Patent No. 3196383, etc.

The absorption maximum wavelength of the squarylium-based compound (A) is preferably not less than 600 nm, more preferably not less than 620 nm, particularly preferably not less than 650 nm, and is preferably less than 800 nm, more preferably not more than 760 nm, particularly preferably not more than 740 nm. When the absorption maximum wavelength is in such a wavelength range, sufficient near-infrared absorption property and visible light transmittance are compatible with each other.

The absorption maximum of the squarylium-based compound (A) is preferably present in the wavelength region of shorter wavelength than the absorption maximum of the compound (B) that is used at the same time. A difference in the absorption maximum wavelength between the squarylium-based compound (A) and the compound (B) is preferably 1 to 100 nm, more preferably 5 to 80 nm, still more preferably 10 to 60 nm. When the difference in the absorption maximum wavelength is in such a range, fluorescence emitted from the squarylium-based compound (A) can be more effectively absorbed, and the intensity of scattered light of the optical filter can be depressed.

(2) Compound (B)

The compound (B) is at least one compound selected from the group consisting of a phthalocyanine-based compound (B-1) and a cyanine-based compound (B-2), and both of the phthalocyanine-based compound (B-1) and the cyanine-based compound (B-2) may be used.

(2-1) Phthalocyanine-Based Compound (B-1)

The phthalocyanine-based compound (B-1) is preferably a compound represented by the following formula (III) (also referred to as a "compound (III)" hereinafter").

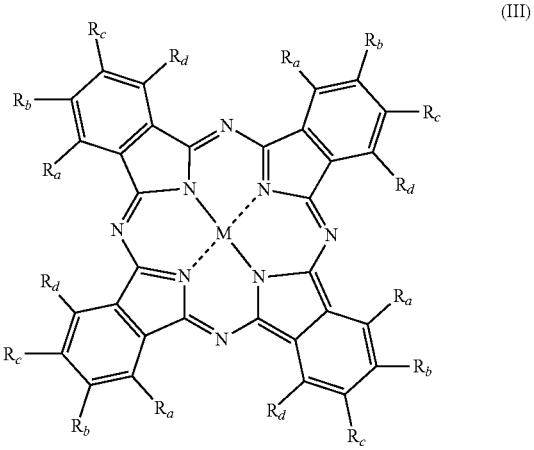

(III)

In the formula (III), M represents two hydrogen atoms, two monovalent metal atoms, a divalent metal atom, or substituted metal atoms containing a trivalent or tetravalent metal atom.

Plural $R_a$, $R_b$, $R_c$ and $R_d$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$, or at least one combination of $R_a$ and $R_b$, $R_b$ and $R_c$, and $R_c$ and $R_d$ is bonded to form at least one group selected from the group consisting of groups represented by the following formulas (A) to (H), and at least one of $R_a$, $R_b$, $R_c$ and $R_d$ bonded to the same aromatic ring is not a hydrogen atom.

The amino group, the amide group, the imide group and the silyl group may have a substituent L defined in the aforesaid formula (I), $L^1$ has the same meaning as that of $L^1$ defined in the formula (I), $L^2$ is a hydrogen atom or any one of $L^a$ to $L^e$ defined in the formula (I), $L^3$ is a hydroxyl group or any one of the above $L^a$ to $L^e$, and $L^4$ is any one of the above $L^a$ to $L^e$.

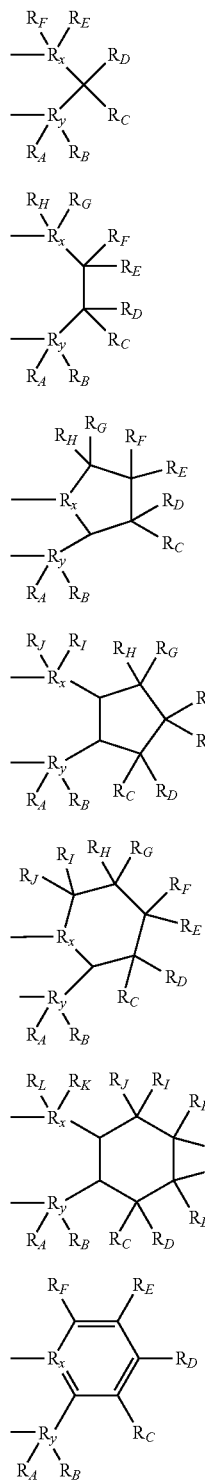

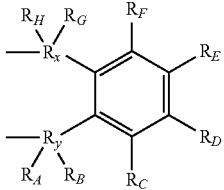

In the formulas (A) to (H), a combination of $R_x$ and $R_y$ is a combination of $R_a$ and $R_b$, $R_b$ and $R_c$, or $R_c$ and $R_d$, and plural $R_A$ to $R_L$ are each independently a hydrogen atom, a halogen atom, a hydroxyl group, a nitro group, an amino group, an amide group, an imide group, a cyano group, a silyl group, $-L^1$, $-S-L^2$, $-SS-L^2$, $-SO_2-L^3$ or $-N=N-L^4$, the amino group, the amide group, the imide group and the silyl group may have the substituent L, and $L^1$ to $L^4$ have the same meanings as those of $L^1$ to $L^4$ defined in the formula (III).

Examples of the amino groups which may have a substituent L in the above $R_a$ to $R_d$ and $R_A$ to $R_L$ include amino group, ethylamino group, dimethylamino group, methylethylamino group, dibutylamino group and diisopropylamino group.

Examples of the amide groups which may have a substituent L in the above $R_a$ to $R_d$ and $R_A$ to $R_L$ include amide group, methylamide group, dimethylamide group, diethylamide group, dipropylamide group, diisopropylamide group, dibutylamide group, α-lactam group, β-lactam group, γ-lactam group and δ-lactam group.

Examples of the imide groups which may have a substituent L in the above $R_a$ to $R_d$ and $R_A$ to $R_L$ include imide group, methylimide group, ethylimide group, diethylimide group, dipropylimide group, diisopropylimide group and dibutylimide group.

Examples of the silyl groups which may have a substituent L in the above $R_a$ to $R_d$ and $R_A$ to $R_L$ include trimethylsilyl group, tert-butyldimethylsilyl group, triphenylsilyl group and triethylsilyl group.

Examples of $-S-L^2$ in the above $R_a$ to $R_d$ and $R_A$ to $R_L$ include thiol group, methyl sulfide group, ethyl sulfide group, propyl sulfide group, butyl sulfide group, isobutyl sulfide group, sec-butyl sulfide group, tert-butyl sulfide group, phenyl sulfide group, 2,6-di-tert-butylphenyl sulfide group, 2,6-diphenylphenyl sulfide group and 4-cumylphenyl sulfide group.

Examples of $-SS-L^2$ in the above $R_a$ to $R_d$ and $R_A$ to $R_L$ include disulfide group, methyl disulfide group, ethyl disulfide group, propyl disulfide group, butyl disulfide group, isobutyl disulfide group, sec-butyl disulfide group, tert-butyl disulfide group, phenyl disulfide group, 2,6-di-tert-butylphenyl disulfide group, 2,6-diphenylphenyl disulfide group and 4-cumylphenyl disulfide group.

Examples of $-SO_2-L^3$ in the above $R_a$ to $R_d$ and $R_A$ to $R_L$ include sulfoxyl group, mesyl group, ethylsulfonyl group, n-butylsulfonyl group and p-toluenesulfonyl group.

Examples of $-N=N-L^4$ in the above $R_a$ to $R_d$ and $R_A$ to $R_L$ include methylazo group, phenylazo group, p-methylphenylazo group and p-dimethylaminophenylazo group.

Examples of the monovalent metal atoms in the above M include Li, Na, K, Rb and Cs.

Examples of the divalent metal atoms in the above M include Be, Mg, Ca, Ba, Ti, Cr, Mn, Fe, Ru, Co, Rh, Ni, Pd, Pt, Cu, Zn, Cd, Hg, Sn and Pb.

Examples of the substituted metal atoms containing a trivalent metal atom in the above M include Al—F, Al—Cl, Al—Br, Al—I, Ga—F, Ga—Cl, Ga—Br, Ga—I, In—F, In—Cl, In—Br, In—I, Tl—F, Tl—Cl, Tl—Br, Tl—I, Fe—Cl, Ru—Cl and Mn—OH.

Examples of the substituted metal atoms containing a tetravalent metal atom in the above M include $TiF_2$, $TiCl_2$, $TiBr_2$, $TiI_2$, $ZrCl_2$, $HfCl_2$, $CrCl_2$, $SiF_2$, $SiCl_2$, $SiBr_2$, $SiI_2$, $GeF_2$, $GeCl_2$, $GeBr_2$, $GeI_2$, $SnF_2$, $SnCl_2$, $SnBr_2$, $SnI_2$, $Zr(OH)_2$, $Hf(OH)_2$, $Mn(OH)_2$, $Si(OH)_2$, $Ge(OH)_2$, $Sn(OH)_2$, $TiR_2$, $CrR_2$, $SiR_2$, $GeR_2$, $SnR_2$, $Ti(OR)_2$, $Cr(OR)_2$, $Si(OR)_2$, $Ge(OR)_2$, $Sn(OR)_2$ (R is an aliphatic group or an aromatic group), TiO, VO and MnO.

As the M, a divalent transition metal, a halide of a trivalent or tetravalent metal or an oxide of a tetravalent metal, each of said metals belonging to the periodic table Group 5 to Group 11 and belonging to the periodic table Period 4 to Period 5, is preferable, and of these, Cu, Ni, Co or Vo is particularly preferable because high visible light transmittance and stability can be attained.

For synthesizing the phthalocyanine-based compound (B-1), a synthesis process by cyclization reaction of such a phthalonitrile derivative as represented by the following formula (V) is generally known, but the resulting phthalocyanine-based compound is a mixture of four kinds of such isomers as represented by the following formulas (VI-1) to (VI-4). In the present invention, one kind of an isomer is given as an example for one kind of the phthalocyanine-based compound unless otherwise noted, but other three kinds of isomers can be also used likewise. It is possible to use these isomers after they are isolated when needed, but in the present invention, they are treated all together as an isomer mixture.

(V)

(VI-1)

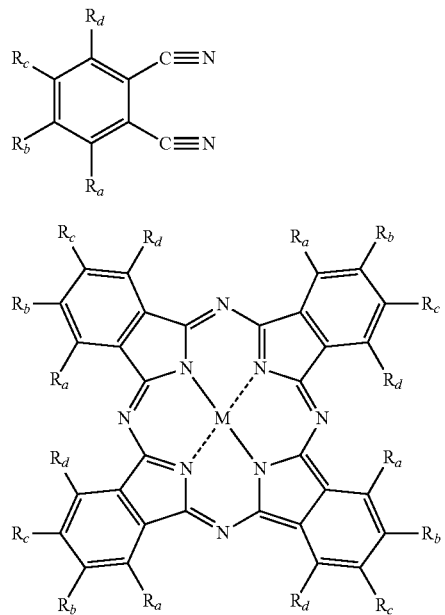

(VI-2)

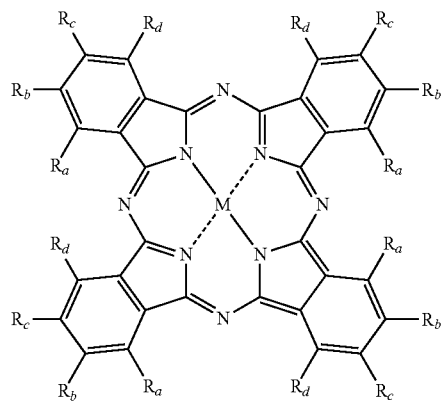

(VI-3)

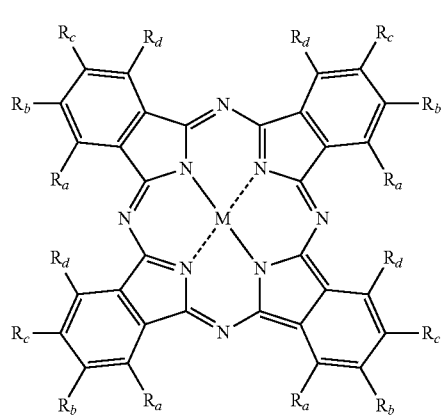

(VI-4)

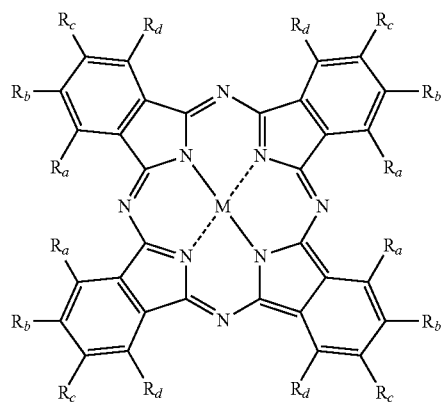

Specific examples of the compounds (III) include (b-1) to (b-56) described in the following Tables 4 to 7, which have basic skeletons represented by the following formulas (III-A) to (III-J).

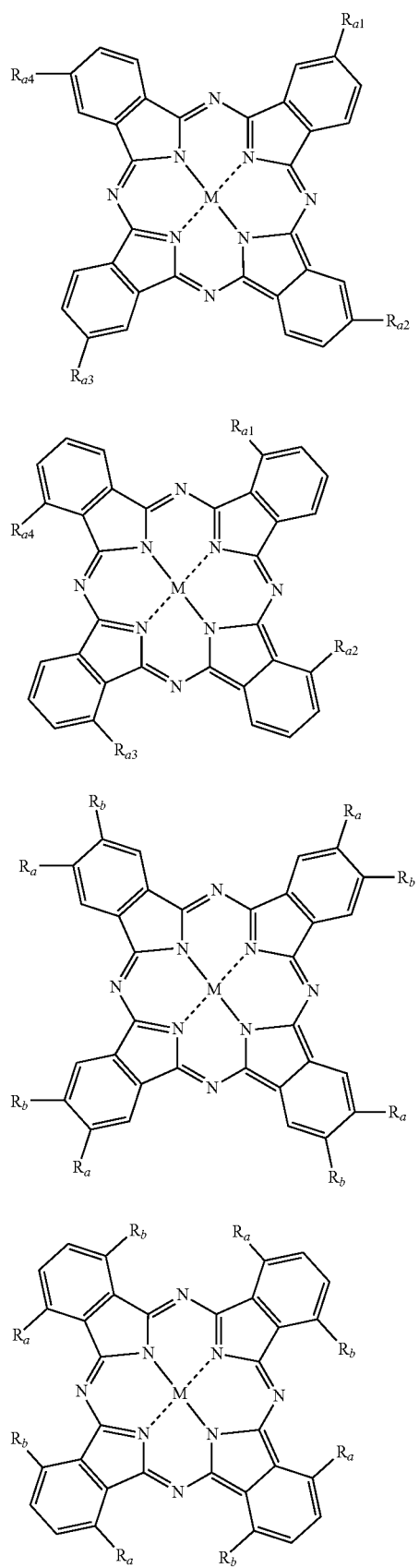
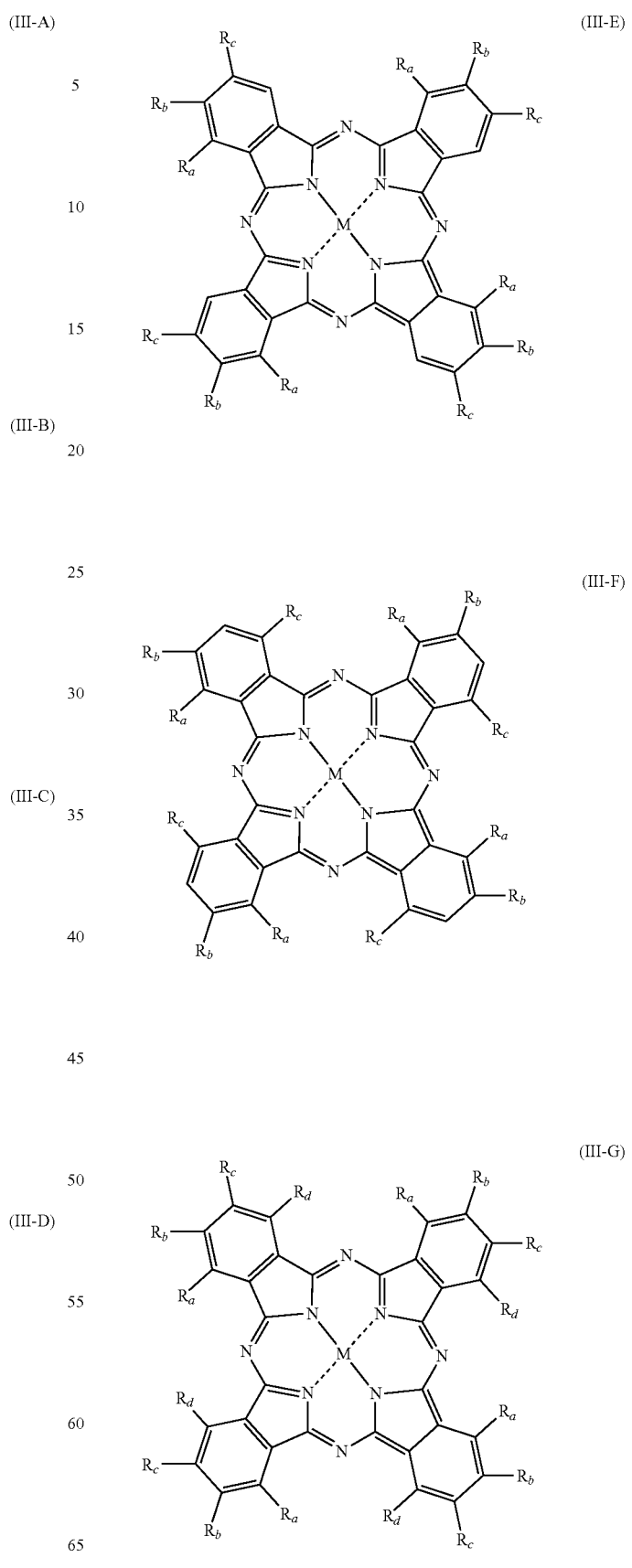

-continued

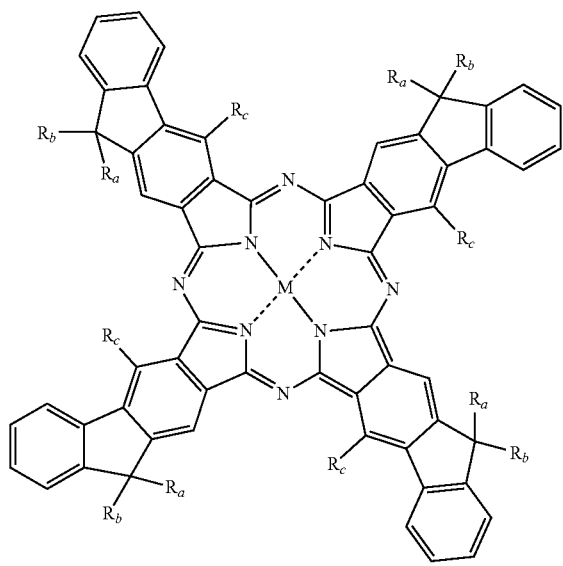

(III-H)

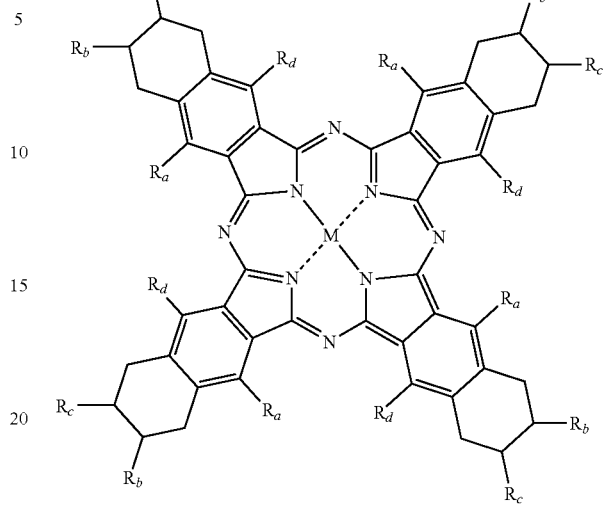

(III-J)

TABLE 4

| Compound | Basic skeleton | M | Substituent $R_{a1}$ | $R_{a2}$ | $R_{a3}$ | $R_{a4}$ |
|---|---|---|---|---|---|---|
| (b-1) | (III-A) | Ni | —O(CH$_2$)$_2$CH$_3$ | —O(CH$_2$)$_2$CH$_3$ | —O(CH$_2$)$_2$CH$_3$ | —O(CH$_2$)$_2$CH$_3$ |
| (b-2) | | Cu | —O(CH$_2$)$_3$CH$_3$ | —O(CH$_2$)$_3$CH$_3$ | —O(CH$_2$)$_3$CH$_3$ | —O(CH$_2$)$_3$CH$_3$ |
| (b-3) | | VO | —O(CH$_2$)$_2$CH$_3$ | —O(CH$_2$)$_2$CH$_3$ | —O(CH$_2$)$_2$CH$_3$ | —O(CH$_2$)$_2$CH$_3$ |
| (b-4) | | VO | —O—C$_6$H$_5$ | —O—C$_6$H$_5$ | —O—C$_6$H$_5$ | —O—C$_6$H$_5$ |
| (b-5) | | Cu | —O—C$_6$H$_5$ | —O—C$_6$H$_5$ | —O—C$_6$H$_5$ | —O—C$_6$H$_5$ |
| (b-5) | | Cu | —S—C$_6$H$_5$ | —S—C$_6$H$_5$ | —S—C$_6$H$_5$ | —S—C$_6$H$_5$ |
| (b-6) | | VO | —S(CH$_2$)$_3$CH$_3$ | —S(CH$_2$)$_3$CH$_3$ | —S(CH$_2$)$_3$CH$_3$ | —S(CH$_2$)$_3$CH$_3$ |
| (b-7) | | Ni | —NH$_2$ | —NH$_2$ | —NH$_2$ | —NH$_2$ |
| (b-8) | | Cu | —NH(CH$_2$)$_3$CH$_3$ | —NH(CH$_2$)$_3$CH$_3$ | —NH(CH$_2$)$_3$CH$_3$ | —NH(CH$_2$)$_3$CH$_3$ |
| (b-9) | | Co | —OH | —OH | —OH | —OH |
| (b-10) | | Cu | t-Bu | t-Bu | t-Bu | t-Bu |
| (b-11) | | VO | t-Bu | t-Bu | t-Bu | t-Bu |
| (b-12) | | VO | —C(CF$_3$)$_3$ | —C(CF$_3$)$_3$ | —C(CF$_3$)$_3$ | —C(CF$_3$)$_3$ |
| (b-13) | | Cu | —O(CF$_2$)$_4$CF$_3$ | —O(CF$_2$)$_4$CF$_3$ | —O(CF$_2$)$_4$CF$_3$ | —O(CF$_2$)$_4$CF$_3$ |
| (b-14) | | Ni | —O—C$_6$H$_4$—C(CH$_3$)$_2$—C$_6$H$_5$ | —O—C$_6$H$_4$—C(CH$_3$)$_2$—C$_6$H$_5$ | —O—C$_6$H$_4$—C(CH$_3$)$_2$—C$_6$H$_5$ | —O—C$_6$H$_4$—C(CH$_3$)$_2$—C$_6$H$_5$ |
| (b-15) | | Cu | —O—C$_6$H$_4$—C(CH$_3$)$_2$—C$_6$H$_5$ | —O—C$_6$H$_4$—C(CH$_3$)$_2$—C$_6$H$_5$ | —O—C$_6$H$_4$—C(CH$_3$)$_2$—C$_6$H$_5$ | —O—C$_6$H$_4$—C(CH$_3$)$_2$—C$_6$H$_5$ |

TABLE 4-continued

| Compound | Basic skeleton | M | Substituent $R_{a1}$ | $R_{a2}$ | $R_{a3}$ | $R_{a4}$ |
|---|---|---|---|---|---|---|
| (b-16) | | Cu | (pentaphenylphenyl) | (pentaphenylphenyl) | (pentaphenylphenyl) | (pentaphenylphenyl) |
| (b-17) | | VO | (pentaphenylphenyl) | (pentaphenylphenyl) | (pentaphenylphenyl) | (pentaphenylphenyl) |
| (b-18) | | Ni | (triphenylphenyl) | (triphenylphenyl) | (triphenylphenyl) | (triphenylphenyl) |
| (b-19) | | Cu | F | —S—Ph | F | —S—Ph |
| (b-20) | | VO | t-Bu | —O(CH$_2$)$_2$CH$_3$ | —O(CH$_2$)$_2$CH$_3$ | —O(CH$_2$)$_2$CH$_3$ |
| (b-21) | | VO | t-Bu | —O(CH$_2$)$_2$CH$_3$ | t-Bu | —O(CH$_2$)$_2$CH$_3$ |
| (b-22) | | Co | —C(CF$_3$)$_3$ | —S(CH$_2$)$_3$CH$_3$ | —S(CH$_2$)$_3$CH$_3$ | —S(CH$_2$)$_3$CH$_3$ |

TABLE 5

| Compound | Basic skeleton | M | Substituent $R_{a1}$ | $R_{a2}$ | $R_{a3}$ | $R_{a4}$ |
|---|---|---|---|---|---|---|
| (b-23) | (III-B) | Co | —NO$_2$ | —NO$_2$ | —NO$_2$ | —NO$_2$ |
| (b-24) | | Cu | —O(CH$_2$)$_3$CH$_3$ | —O(CH$_2$)$_3$CH$_3$ | —O(CH$_2$)$_3$CH$_3$ | —O(CH$_2$)$_3$CH$_3$ |
| (b-25) | | VO | Me | Me | Me | Me |
| (b-26) | | Cu | —O—Ph | —O—Ph | —O—Ph | —O—Ph |
| (b-27) | | VO | —OH | —OH | —OH | —OH |
| (b-28) | | Ni | F | F | F | F |
| (b-29) | | Cu | Cl | Cl | Cl | Cl |
| (b-30) | | VO | t-Bu | —OH | t-Bu | —OH |

TABLE 6

| Compound | Basic skeleton | M | $R_a$ | $R_b$ | $R_c$ |
|---|---|---|---|---|---|
| (b-31) | (III-C) | VO | Cl | Cl | — |
| (b-32) | | Cu | F | F | — |
| (b-33) | | Ni | —O(CH$_2$)$_3$CH$_3$ | —O(CH$_2$)$_3$CH$_3$ | — |
| (b-34) | | VO | —OH | t-Bu | — |
| (b-35) | (III-D) | Co | —OH | —OH | — |
| (b-36) | | Ni | Et | F | — |
| (b-37) | | Cu | —O(CH$_2$)$_2$CH$_3$ | —O(CH$_2$)$_2$CH$_3$ | — |
| (b-38) | | VO | t-Bu | t-Bu | — |
| (b-39) | (III-E) | VO | Me | Me | t-Bu |
| (b-40) | | Cu | F | F | Et |
| (b-41) | | Co | —NO$_2$ | n-Pr | n-Pr |
| (b-42) | | Ni | —OH | F | —O(CH$_2$)$_4$CH$_3$ |
| (b-43) | (III-F) | VO | —O(CH$_2$)$_3$CH$_3$ | Me | —O(CH$_2$)$_3$CH$_3$ |
| (b-44) | | VO | F | t-Bu | F |
| (b-45) | | Cu | Et | —NH$_2$ | Et |
| (b-46) | | Co | Cl | 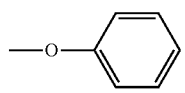 —O—C$_6$H$_5$ | Cl |

TABLE 7

| Compound | Basic skeleton | M | $R_a$ | $R_b$ | $R_c$ | $R_d$ |
|---|---|---|---|---|---|---|
| (b-47) | (III-G) | VO | F | F | F | F |
| (b-48) | | Cu | Cl | —O(CH$_2$)$_3$CH$_3$ | —O(CH$_2$)$_3$CH$_3$ | Cl |
| (b-49) | | VO | F | t-Bu | F | F |
| (b-50) | | Ni | —OH | n-Pr | n-Pr | —OH |
| (b-51) | (III-H) | Cu | —C$_6$H$_5$ | —C$_6$H$_5$ | Me | — |
| (b-52) | | Cu | —C$_6$H$_4$—Me | —C$_6$H$_4$—Me | Me | — |
| (b-53) | | VO | —C$_6$H$_4$—n-Bu | —C$_6$H$_4$—Me | Me | — |
| (b-54) | (III-J) | VO | F | t-Bu | t-Bu | F |
| (b-55) | | Cu | Me | Et | Et | Me |
| (b-56) | | Cu | —OH | F | —O(CH$_2$)$_3$CH$_3$ | —OH |

It is enough just to synthesize the compound (III) by a process generally known, and for example, the compound can be synthesized referring to the processes described in Japanese Patent No. 4081149 and "Phthalocyanine-Chemistry and Functions-" (IPC, 1997).

The absorption maximum wavelength of the phthalocyanine-based compound (B-1) is preferably more than 600 nm, more preferably not less than 640 nm, particularly preferably not less than 670 nm, and is preferably not more than 800 nm, more preferably not more than 780 nm, particularly preferably not more than 760 nm. When the absorption maximum wavelength is in such a wavelength range, sufficient near-infrared absorption property and visible light transmittance are compatible with each other. Moreover, fluorescence emitted from the squarylium-based compound (A) can be effectively absorbed, and the intensity of scattered light of the optical filter can be depressed.

(2-2) Cyanine-Based Compound (B-2)

The cyanine-based compound (B-2) is preferably any one of compounds represented by the following formulas (IV-1) to (IV-3) (also referred to as "compounds (IV-1) to (IV-3)" hereinafter).

(IV-1)

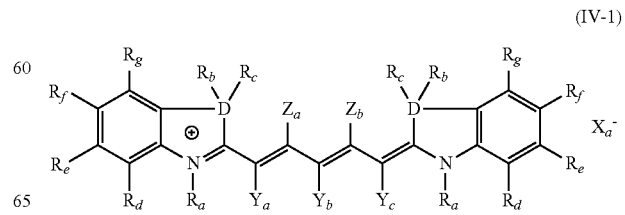

-continued

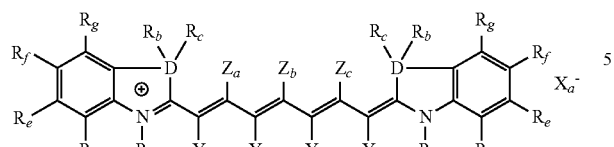 (IV-2)

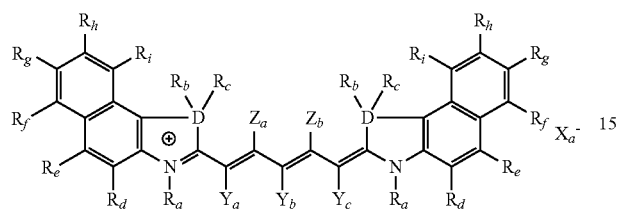 (IV-3)

In the formulas (IV-1) to (IV-3), $X_a^-$ is a monovalent anion, plural D are each independently a carbon atom, a nitrogen atom, an oxygen atom or a sulfur atom, plural $R_a$, $R_b$, $R_c$, $R_d$, $R_e$, $R_f$, $R_g$, $R_h$ and $R_i$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$, or at least one combination of $R_b$ and $R_c$, $R_d$ and $R_e$, $R_e$ and $R_f$, $R_f$ the $R_g$, $R_g$ and $R_h$, and $R_h$ and $R_i$ is bonded to form at least one group selected from the group consisting of groups represented by the following formulas (A) to (H), the amino group, the amide group, the imide group and the silyl group may have a substituent L defined in the aforesaid formula (I), $L^1$ has the same meaning as that of $L^1$ defined in the formula (I), $L^2$ is a hydrogen atom or any one of $L^a$ to $L^e$ defined in the formula (I), $L^3$ is a hydrogen atom or any one of the above $L^a$ to $L^e$, $L^4$ is any one of the above $L^a$ to $L^e$, and $Z_a$ to $Z_c$ and $Y_a$ to $Y_d$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$ ($L^1$ to $L^4$ have the same meanings as those of $L^1$ to $L^4$ in the above $R_a$ to $R_i$), or neighboring two Z or neighboring two Y are bonded to each other to form an alicyclic hydrocarbon group of 5- to 6-membered ring, which may contain at least one of a nitrogen atom, an oxygen atom and a sulfur atom, or neighboring two Z or neighboring two Y are bonded to each other to form an aromatic hydrocarbon group of 6 to 14 carbon atoms, or neighboring two Z or neighboring two Y are bonded to each other to form a heteroaromatic hydrocarbon group of 3 to 14 carbon atoms, which contains at least one of a nitrogen atom, an oxygen atom and a sulfur atom, and these alicyclic hydrocarbon group, aromatic hydrocarbon group and heteroaromatic hydrocarbon group may have an aliphatic hydrocarbon group of 1 to 9 carbon atoms or a halogen atom.

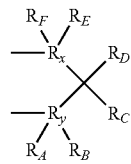 (A)

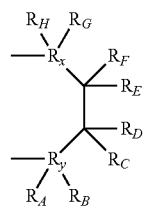 (B)

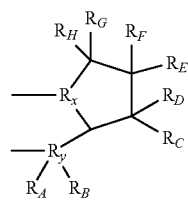 (C)

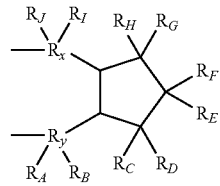 (D)

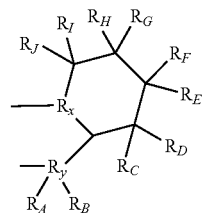 (E)

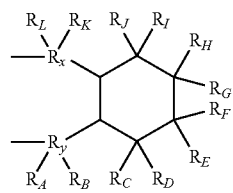 (F)

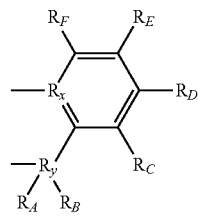 (G)

-continued

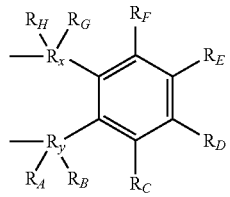

(H)

In the formulas (A) to (H), a combination of $R_x$ and $R_y$ is a combination of $R_b$ and $R_c$, $R_d$ and $R_e$, $R_e$ and $R_f$, $R_f$ and $R_g$, $R_g$ and $R_h$, or $R_h$ and $R_i$, and plural $R_A$ to $R_L$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$ ($L^1$ to $L^4$ have the same meanings as those of $L^1$ to $L^4$ defined in the formulas (IV-1) to (IV-3)), and the amino group, the amide group, the imide group and the silyl group may have the substituent L.

Examples of the alicyclic hydrocarbon groups of 5- to 6-membered ring, which are formed by bonding of Z and Z or Y and Y to each other and may contain at least one of a nitrogen atom, an oxygen atom and a sulfur atom, in the above $Z_a$ to $Z_c$ and $Y_a$ to $Y_d$ include the compounds given as examples of the alicyclic hydrocarbon groups and the heterocyclic rings in the aforesaid substituent L (except the heteroaromatic hydrocarbon groups).

Examples of the aromatic hydrocarbon groups of 6 to 14 carbon atoms, which are formed by bonding of Z and Z or Y and Y to each other, in the above $Z_a$ to $Z_c$ and $Y_a$ to $Y_d$ include the compounds given as examples of the aromatic hydrocarbon groups in the aforesaid substituent L.

Examples of the heteroaromatic hydrocarbon groups of 3 to 14 carbon atoms, which are formed by bonding of Z and Z or Y and Y to each other, in the above $Z_a$ to $Z_1$ and $Y_a$ to $Y_d$ include the compounds given as examples of the heterocyclic groups in the aforesaid substituent L (except the alicyclic hydrocarbon groups containing at least one of a nitrogen atom, an oxygen atom and a sulfur atom).

Examples of the amino groups which may have a substituent L in the above $R_a$ to $R_i$ and $R_A$ to $R_L$ include amino group, ethylamino group, dimethylamino group, methylethylamino group, dibutylamino group and diisopropylamino group.

Examples of the amide groups which may have a substituent L in the above $R_a$ to $R_i$ and $R_A$ to $R_L$ include amide group, methylamide group, dimethylamide group, diethylamide group, dipropylamide group, diisopropylamide group, dibutylamide group, α-lactam group, β-lactam group, γ-lactam group and δ-lactam group.

Examples of the imide groups which may have a substituent L in the above $R_a$ to $R_i$ and $R_A$ to $R_L$ include imide group, methylimide group, ethylimide group, diethylimide group, dipropylimide group, diisopropylimide group and dibutylimide group.

Examples of the silyl groups which may have a substituent L in the above $R_a$ to $R_i$ and $R_A$ to $R_L$ include trimethylsilyl group, tert-butyldimethylsilyl group, triphenylsilyl group and triethylsilyl group.

Examples of $-S-L^2$ in the above $R_a$ to $R_i$ and $R_A$ to $R_L$ include thiol group, methyl sulfide group, ethyl sulfide group, propyl sulfide group, butyl sulfide group, isobutyl sulfide group, sec-butyl sulfide group, tert-butyl sulfide group, phenyl sulfide group, 2,6-di-tert-butylphenyl sulfide group, 2,6-diphenylphenyl sulfide group and 4-cumylphenyl sulfide group.

Examples of $-SS-L^2$ in the above $R_a$ to $R_i$ and $R_A$ to $R_L$ include disulfide group, methyl disulfide group, ethyl disulfide group, propyl disulfide group, butyl disulfide group, isobutyl disulfide group, sec-butyl disulfide group, tert-butyl disulfide group, phenyl disulfide group, 2,6-di-tert-butylphenyl disulfide group, 2,6-diphenylphenyl disulfide group and 4-cumylphenyl disulfide group.

Examples of $-SO_2-L^3$ in the above $R_a$ to $R_i$ and $R_A$ to $R_L$ include sulfoxyl group, mesyl group, ethylsulfonyl group, n-butylsulfonyl group and p-toluenesulfonyl group.

Examples of $-N=N-L^4$ in the above $R_a$ to $R_i$ and $R_A$ to $R_L$ include methylazo group, phenylazo group, p-methylphenylazo group and p-dimethylaminophenylazo group.

Specific examples of the compounds (IV-1) to (IV-3) include (c-1) to (c-19) described in the following Table 8.

TABLE 8

| Compound | Base skeleton | D | $R_a$ | $R_b$ | $R_c$ | $R_d$ | $R_e$ | $R_f$ | $R_g$ | $R_h$ | $R_i$ | $Y_a$ | $Y_b$ | $Y_c$ | $Y_d$ | $Z_a$ | $Z_b$ | $Z_c$ | $X_a^-$ |
|---|---|---|---|---|---|---|---|---|---|---|---|---|---|---|---|---|---|---|---|
| (c-1) | (IV-1) | C | n-Bu | Me | Me | H | H | H | H | — | — | H | H | H | — | H | H | — | PF6 |
| (c-2) |  | C | n-Bu | Me | Me | H | H | H | H | — | — | H | Cl | H | — | H | H | — | PF6 |
| (c-3) |  | S | Et | — | — | H | H | H | H | — | — | H | H | H | — | H | H | — | I |
| (c-4) | (IV-2) | C | n-Bu | Me | Me | H | H | H | H | — | — | H | H | H | H | H | H | H | PF6 |
| (c-5) |  | S | Et | — | — | H | H | H | H | — | — | H | H | H | H | H | H | H | I |
| (c-6) |  | C | n-Bu | Me | Me | H | H | H | H | — | — | H | trimethylene | H | H | H | H | H | PF6 |
| (c-7) |  | S | Et | — | — | H | H | H | H | — | — | H | H | H | trimethylene | H | H | H | I |
| (c-8) |  | C | n-Bu | Me | Me | H | H | H | H | — | — | H | ethylene | H | H | Ph | H | H | PF6 |
| (c-9) |  | C | n-Bu | Me | Me | H | H | H | H | — | — | H | ethylene | H | H | diphenylamino | H | H | PF6 |
| (c-10) |  | C | MeOEt | Me | Me | H | H | Cl | H | — | — | H | trimethylene | H | H | Cl | H | H | N(SO2CF3)2 |
| (c-11) |  | C | MeOEt | Me | Me | H | H | Cl | H | — | — | H | H | H | H | H | H | H | N(SO2CF3)2 |
| (c-12) |  | C | MeOEt | Me | Me | H | H | H | H | — | — | H | trimethylene | H | H | Cl | H | H | N(SO2CF3)2 |
| (c-13) |  | S | n-Bu | — | — | H | H | H | H | — | — | H | trimethylene | H | H | Cl | H | H | I |
| (c-14) |  | C | Et | Me | Me | H | H | H | H | — | — | H | trimethylene | H | H | Cl | H | H | I |
| (c-15) | (IV-3) | C | 3-methyl-butyl | Me | Me | H | H | H | H | H | H | H | H | — | H | H | H | — | PF6 |
| (c-16) |  | C | 3-methyl-butyl | Me | Me | H | H | H | H | H | H | Cl | H | — | H | H | H | — | PF6 |
| (c-17) |  | C | MeOEt | Me | Me | H | H | H | H | H | H | H | H | — | H | H | H | — | N(SO2CF3)2 |
| (c-18) |  | C | 3-methyl-butyl | Me | Me | H | H | H | H | H | H | H | H | — | trimethylene | H | — | — | PF6 |
| (c-19) |  | C | 3-methyl-butyl | Me | Me | H | H | H | H | H | H | Ph | H | — | ethylene | H | — | — | PF6 |

It is enough just to synthesize the compounds (IV-1) to (IV-3) by processes generally known, and for example, the compounds can be synthesized by the process described in Japanese Patent Laid-Open Publication No. 2009-108267.

The absorption maximum wavelength of the cyanine-based compound (B-2) is preferably more than 600 nm, more preferably not less than 640 nm, particularly preferably not less than 670 nm, and is preferably not more than 800 nm, more preferably not more than 780 nm, particularly preferably not more than 760 nm. When the absorption maximum wavelength is in such a wavelength range, sufficient near-infrared absorption property and visible light transmittance are compatible with each other. Moreover, fluorescence emitted from the squarylium-based compound (A) can be effectively absorbed, and the intensity of scattered light of the optical filter can be depressed.

(3) Content Percentage of Squarylium-Based Compound (A) and Compound (B)

When the amount of the whole near-infrared absorbing dye is 100% by weight, the content percentage of the squarylium-based compound (A) is preferably 20 to 95% by weight, more preferably 25 to 85% by weight, particularly preferably 30 to 80% by weight, and the content percentage of the compound (B) is preferably 5 to 80% by weight, more preferably 10 to 70% by weight, particularly preferably 15 to 60% by weight, in the present invention. When the content percentages of the squarylium-based compound (A) and the compound (B) are in the above ranges, favorable visible light transmittance, improvement in incident angle dependence and scattered light reduction effect are compatible with one another. The squarylium-based compound (A) and the compound (B) may be each used in combination of two or more kinds. In addition to the squarylium-based compound (A) and the compound (B), another near-infrared absorbing dye may be used within limits not detrimental to the effect of the present invention, as far as the above content percentages are satisfied.

(4) Content of Near-Infrared Absorbing Dye

In the resin substrate, the content of the near-infrared absorbing dye is preferably 0.01 to 5.0 parts by weight, more preferably 0.02 to 3.5 parts by weight, particularly preferably 0.03 to 2.5 parts by weight, based on 100 parts by weight of the resin used in the production of the resin substrate. When the content of the near-infrared absorbing dye is in the above range, favorable near-infrared absorption property and high visible light transmittance are compatible each other.

<Resin>

The resin substrate for use in the present invention is not specifically restricted provided that it contains a resin and a near-infrared absorbing dye containing the squarylium-based compound (A) and the compound (B), but the resin is preferably a transparent resin. Such a resin is not specifically restricted as far as it does not impair the effect of the present invention. However, in order to ensure heat stability and moldability into a film and in order to produce a film capable of forming a dielectric multilayer film through high-temperature deposition that is carried out at a deposition temperature of not lower than 100° C., there can be mentioned, for example, a resin preferably having a glass transition temperature (Tg) of 110 to 380° C., more preferably 110 to 370° C., still more preferably 120 to 360° C. When the glass transition temperature of the resin is not lower than 140° C., a film capable of forming a dielectric multilayer film by deposition at a higher temperature is obtained, so that such a glass transition temperature is particularly preferable.

As the resin, a resin preferably having a total light transmittance (JIS K7105) of 75 to 95%, more preferably 78 to 95%, particularly preferably 80 to 95%, in a thickness of 0.1 mm can be used. When the total light transmittance is in such a range, the resulting substrate exhibits favorable transparency as an optical film.

Examples of the resins include a cyclic polyolefin-based resin, an aromatic polyether-based resin, a polyimide-based resin, a fluorene polycarbonate-based resin, a fluorene polyester-based resin, a polycarbonate-based resin, a polyamide-based (aramid-based) resin, a polyarylate-based resin, a polysulfone-based resin, a polyether sulfone-based resin, a polyparaphenylene-based resin, a polyamidoimide-based resin, a polyethylene naphthalate (PEN)-based resin, a fluorinated aromatic polymer-based resin, a (modified) acrylic resin, an epoxy-based resin, an allyl ester-based curing type resin and a silsesquioxane-based ultraviolet curing resin.

(1) Cyclic Olefin-Based Resin

The cyclic olefin-based resin is preferably a resin obtained from at least one monomer selected from the group consisting of a monomer represented by the following formula ($X_0$) and a monomer represented by the following formula ($Y_0$), or a resin obtained by further hydrogenating the resin thus obtained.

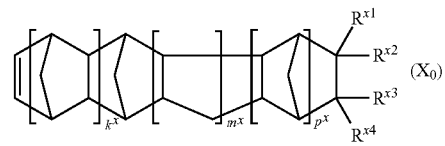

In the formula ($X_0$), $R^{x1}$ to $R^{x4}$ are each independently an atom or a group selected from the following (i') to (viii'), and $k^x$, $m^x$ and $p^x$ are each independently 0 or a positive integer.

(i') a hydrogen atom (ii') a halogen atom (iii') a trialkylsilyl group (iv') a substituted or unsubstituted hydrocarbon group of 1 to 30 carbon atoms, which has a linking group containing an oxygen atom, a sulfur atom, a nitrogen atom or a silicon atom (v') a substituted or unsubstituted hydrocarbon group of 1 to 30 carbon atoms (vi') a polar group (except (iv'))

(vii') an alkylidene group formed by bonding of $R^{x1}$ and $R^{x2}$ or $R^{x3}$ and $R^{x4}$ to each other is represented, but $R^{x1}$ to $R^{x4}$ which do not take part in the bonding are each independently an atom or a group selected from the above (i') to (vi').

(viii') a monocyclic or polycyclic hydrocarbon ring or a heterocyclic ring formed by bonding of $R^{x1}$ and $R^{x2}$ or $R^{x3}$ and $R^{x4}$ to each other is represented, but $R^{x1}$ to $R^{x4}$ which do not take part in the bonding are each independently an atom or a group selected from the above (i') to (vi'); or a monocyclic hydrocarbon ring or a heterocyclic ring formed by bonding of $R^{x2}$ and $R^{x3}$ each other, but $R^{x1}$ to $R^{x4}$ which do not take part in the bonding are each independently an atom or a group selected from the above (i') to (vi').

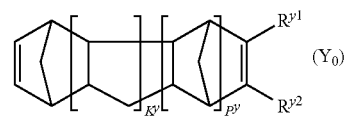

In the formula ($Y_0$), $R^{y1}$ and $R^{y2}$ are each independently an atom or a group selected from the aforesaid (i') to (vi') or represent the following (ix'), and $K^y$ and $P^y$ are each independently 0 or a positive integer.

(ix') a monocyclic or polycyclic aliphatic hydrocarbon, an aromatic hydrocarbon or a heterocyclic ring, which is formed by bonding of $R^{y1}$ and $R^{y2}$ to each other, is represented.

(2) Aromatic Polyether-Based Resin

The aromatic polyether-based resin preferably has at least one structural unit selected from the group consisting of a structural unit represented by the following formula (1) and a structural unit represented by the following formula (2).

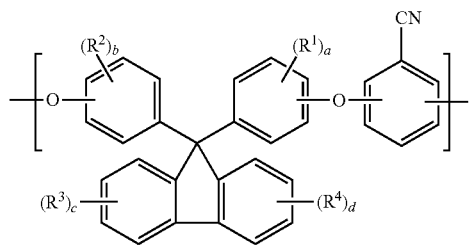

(1)

In the formula (1), $R^1$ to $R^4$ are each independently a monovalent organic group of 1 to 12 carbon atoms, and a to d are each independently an integer of 0 to 4.

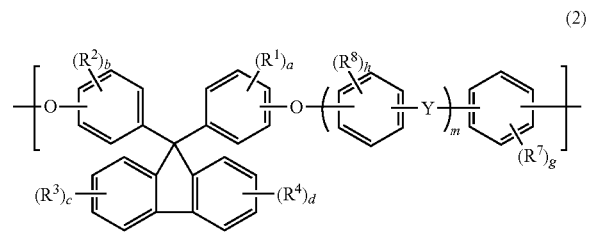

(2)

In the formula (2), $R^1$ to $R^4$ and a to d have the same meanings as those of $R^1$ to $R^4$ and a to d in the formula (1), respectively, Y is a single bond, —$SO_2$— or >C=O, $R^7$ and $R^8$ are each independently a halogen atom, a monovalent organic group of 1 to 12 carbon atoms or a nitro group, g and h are each independently an integer of 0 to 4, and m is 0 or 1, but when m is 0, $R^7$ is not a cyano group.

Further, the aromatic polyether-based resin preferably has at least one structural unit selected from the group consisting of a structural unit represented by the following formula (3) and a structural unit represented by the following formula (4).

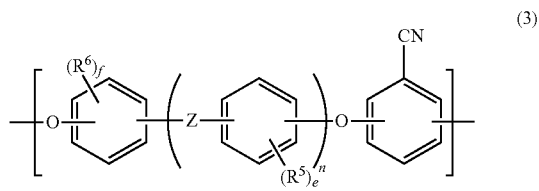

(3)

In the formula (3), $R^5$ to $R^6$ are each independently a monovalent organic group of 1 to 12 carbon atoms, Z is a single bond, —O—, —S—, —$SO_2$—, >C=O, —CONH—, —COO— or a divalent organic group of 1 to 12 carbon atoms, e and f are each independently an integer of 0 to 4, and n is 0 or 1.

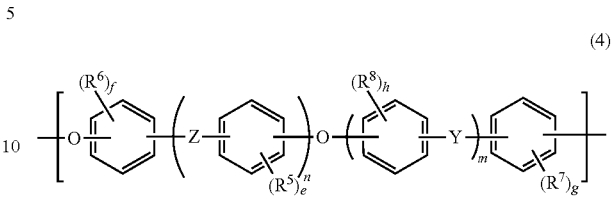

(4)

In the formula (4), $R^7$, $R^8$, Y, m, g and h have the same meanings as those of $R^7$, $R^8$, Y, m, g and h in the formula (2), respectively, and $R^5$, $R^6$, Z, n, e and f have the same meanings as those of $R^5$, $R^6$, Z, n, e and f in the formula (3), respectively.

(3) Polyimide-Based Resin

The polyimide-based resin is not specifically restricted provided that it is a high-molecular compound containing an imide linkage in a repeating unit, and it can be synthesized by a process described in, for example, Japanese Patent Laid-Open Publication No. 2006-199945 or Japanese Patent Laid-Open Publication No. 2008-163107.

(4) Fluorene Polycarbonate-Based Resin

The fluorene polycarbonate-based resin is not specifically restricted provided that it is a polycarbonate resin containing a fluorene moiety, and it can be synthesized by a process described in, for example, Japanese Patent Laid-Open Publication No. 2008-163107.

(5) Fluorene Polyester-Based Resin

The fluorene polyester-based resin is not specifically restricted provided that it is a polyester resin containing a fluorene moiety, and it can be synthesized by a process described in, for example, Japanese Patent Laid-Open Publication No. 2010-285505 or Japanese Patent Laid-Open Publication No. 2011-197450.

(6) Fluorinated Aromatic Polymer-Based Resin

The fluorinated aromatic polymer-based resin is not specifically restricted provided that it is a polymer containing an aromatic ring having at least one fluorine and a repeating unit containing at least one linkage selected from the group consisting of an ether linkage, a ketone linkage, a sulfone linkage, am amide linkage, an imide linkage and an ester linkage, and it can be synthesized by a process described in, for example, Japanese Patent Laid-Open Publication No. 2008-181121.

(7) Commercial Products

As commercial products of the transparent resins employable in the present invention, the following commercial products, etc. can be mentioned. Examples of commercial products of the cyclic olefin-based resins include Arton available from JSR Corporation, ZEONOR available from Zeon Corporation, APEL available from Mitsui Chemicals, Inc. and TOPAS available from Polyplastics Co., Ltd. Examples of commercial products of the polyether sulfone-based resins include Sumika Excel PES available from Sumitomo Chemical Co., Ltd. Examples of commercial products of the polyimide-based resins include Neoprim L available from Mitsubishi Gas Chemical Company Inc. Examples of commercial products of the polycarbonate-based resins include PURE-ACE available from Teijin Ltd. Examples of commercial products of the fluorene polycarbonate-based resins include Yupizeta EP-5000 available from Mitsubishi Gas Chemical Company Inc. Examples of commercial products of the fluorene polyester-based resins include OKP4HT available from Osaka Gas Chemicals Co., Ltd. Examples of commercial products of the acrylic resins include ACRIVIEWA available from Nippon Shokubai Co., Ltd. Examples of commercial products of the silsesquioxane-based UV curing resins include Silplus available from Shin-Nittetsu Chemical Co., Ltd.

<Near-Ultraviolet Absorbing Agent>

The near-ultraviolet absorbing agent employable in the present invention is preferably at least one compound selected from the group consisting of an azomethine-based compound, an indole-based compound, a benzotriazole-based compound and a triazine-based compound, and preferably has at least one absorption maximum in the wavelength region of 300 to 420 nm. By adding such a near-ultraviolet absorbing agent in addition to the near-infrared absorbing dye, an optical filter having small incident angle dependence even in the near-ultraviolet wavelength region can be obtained.

(1) Azomethine-Based Compound

Although the azomethine-based compound is not specifically restricted, it can be represented by, for example, the following formula (5).

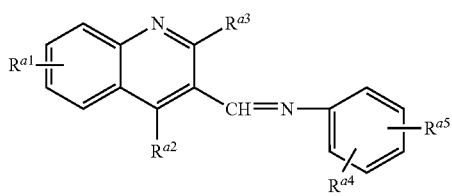

(5)

In the formula (5), $R^{a1}$ to $R^{a5}$ are each independently a hydrogen atom, a halogen atom, a hydroxyl group, a carboxyl group, an alkyl group of 1 to 15 carbon atoms, an alkoxy group of 1 to 9 carbon atoms or an alkoxycarbonyl group of 1 to 9 carbon atoms.

(2) Indole-Based Compound

Although the Indole-based compound is not specifically restricted, it can be represented by, for example, the following formula (6).

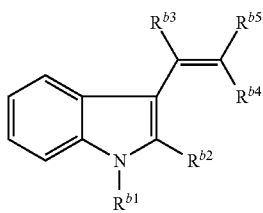

(6)

In the formula (6), $R^{b1}$ to $R^{b5}$ are each independently a hydrogen atom, a halogen atom, a hydroxyl group, a carboxyl group, a cyano group, a phenyl group, an aralkyl group, an alkyl group of 1 to 9 carbon atoms, an alkoxy group of 1 to 9 carbon atoms or an alkoxycarbonyl group of 1 to 9 carbon atoms.

(3) Benzotriazole-Based Compound

Although the benzotriazole-based compound is not specifically restricted, it can be represented by, for example, the following formula (7).

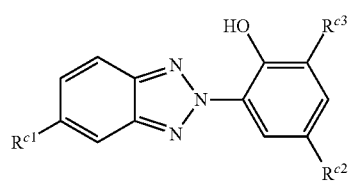

(7)

In the formula (7), $R^{c1}$ to $R^{c3}$ are each independently a hydrogen atom, a halogen atom, a hydroxyl group, an aralkyl group, an alkyl group of 1 to 9 carbon atoms, an alkoxy group of 1 to 9 carbon atoms or an alkyl group of 1 to 9 carbon atoms having an alkoxycarbonyl group of 1 to 9 carbon atoms as an substituent.

(4) Triazine-Based Compound

Although the triazine-based compound is not specifically restricted, it can be represented by, for example, the following formula (8), (9) or (10).

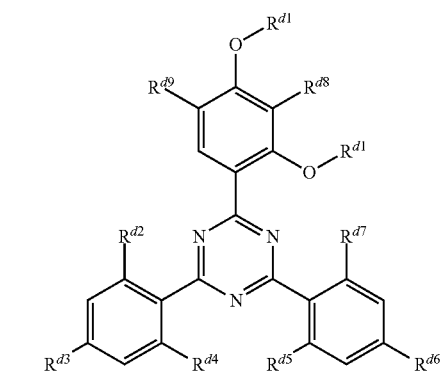

(8)

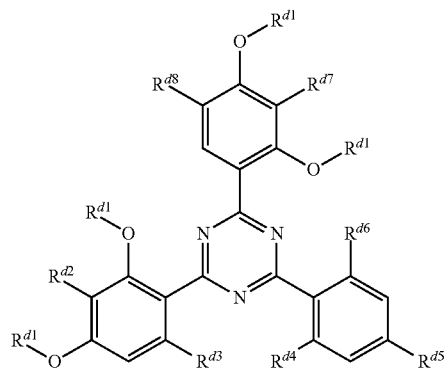

(9)

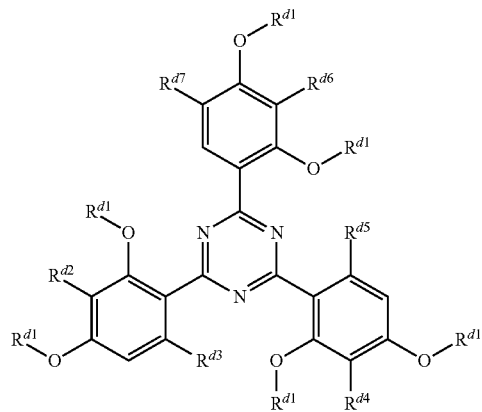

(10)

In the formulas (8) to (10), each $R^{d1}$ is a hydrogen atom, an alkyl group of 1 to 15 carbon atoms, a cycloalkyl group of 3 to 8 carbon atoms, an alkenyl group of 3 to 8 carbon atoms, an aryl group of 6 to 18 carbon atoms, an alkylaryl group of 7 to 18 carbon atoms or an arylalkyl group. These alkyl group, cycloalkyl group, alkenyl group, aryl group, alkylaryl group and arylalkyl group may be substituted by a hydroxyl group, a halogen atom, an alkyl group of 1 to 12 carbon atoms or an alkoxy group, and may be interrupted by an oxygen atom, a sulfur atom, a carbonyl group, an ester group, an amide group or an imino group. The substitution and the interruption may be combined. $R^{d2}$ to $R^{d9}$ are each independently a hydrogen atom, a halogen atom, a hydroxyl group, an alkyl group of 1 to 15 carbon atoms, a cycloalkyl group of 3 to 8 carbon atoms, an alkenyl group of 3 to 8 carbon atoms, an aryl group of 6 to 18 carbon atoms, an alkylaryl group of 7 to 18 carbon atoms or an arylalkyl group.

<Other Components>

The resin substrate may further contain additives, such as antioxidant, ultraviolet absorbing agent, dye which absorbs near-infrared rays, fluorescence quencher and metal complex-based compound, within limits not detrimental to the effect of the present invention. When the resin substrate is produced by the later-described cast molding, production of the resin substrate can be facilitated by adding a leveling agent and an anti-foaming agent. These other components may be used singly or in combination of two or more kinds.

Examples of the antioxidants include
2,6-di-t-butyl-4-methylphenol,
2,2'-dioxy-3,3'-di-t-butyl-5,5'-dimethyldiphenylmethane and
tetrakis[methylene-3-(3,5-di-t-butyl-4-hydroxyphenyl) propionate]methane.

Examples of the dyes which absorb near-infrared rays include a dithiol-based dye, a diimonium-based dye, a porphyrin-based dye and a croconium-based dye. The structures of these dyes are not specifically restricted, and generally known dyes can be used provided that they do not impair the effect of the present invention.

These additives may be mixed together with a resin, etc. in the production of the resin substrate, or they may be added when a resin is produced. Although the amount of such an additive is properly selected according to the desired properties, it is usually 0.01 to 5.0 parts by weight, preferably 0.05 to 2.0 parts by weight, based on 100 parts by weight of the resin.

<Production Process for Resin Substrate>

The resin substrate can be formed by, for example, melt molding or cast molding, and if necessary, after molding, coating of the molded product with coating agents, such as an antireflection agent, a hard coating agent and/or an antistatic agent, can be carried out to produce the resin substrate.

(1) Melt Molding

The resin substrate can be produced by a process comprising melt-molding pellets obtained by melt-kneading a resin and a near-infrared absorbing dye; a process comprising melt-molding a resin composition containing a resin and a near-infrared absorbing dye; a process comprising melt-molding pellets obtained by removing a solvent from a resin composition containing a near-infrared absorbing dye, a resin and a solvent; or the like. Examples of the melt molding processes include injection molding, melt extrusion molding and blow molding.

(2) Cast Molding

The resin substrate can be also produced by a process comprising casting a resin composition containing a near-infrared absorbing dye, a resin and a solvent onto an appropriate base and removing the solvent; a process comprising casting a resin composition containing coating agents, such as an antireflection agent, a hard coating agent and/or an antistatic agent, a near-infrared absorbing dye and a resin onto an appropriate base; a process comprising casting a curable composition containing coating agents, such as an antireflection agent, a hard coating agent and/or an antistatic agent, a near-infrared absorbing dye and a resin onto an appropriate base, curing the composition and drying the cured product; or the like.

Examples of the bases include a glass plate, a steel belt, a steel drum and a transparent resin (e.g., polyester film, cyclic olefin-based resin film).

The resin substrate can be obtained by peeling the coating film from the base, or as far as the effect of the present invention is not impaired, a laminate of the base and the coating film may be used as the resin substrate without peeling the base.

Further, the resin substrate can be also formed directly on an optical part by a process comprising coating an optical part made of a glass plate, quartz, transparent plastic or the like with the aforesaid resin composition and drying the solvent, a process comprising coating the optical part with the aforesaid curable composition, curing the composition and drying the cured product, or the like.

The amount of the residual solvent in the resin substrate obtained by the above process is preferably as small as possible. Specifically, the amount of the residual solvent is preferably not more than 3% by weight, more preferably not more than 1% by weight, still more preferably not more than 0.5% by weight, based on the weight of the resin substrate. When the amount of the residual solvent is in the above range, a resin substrate which is rarely deformed or rarely changed in properties and can easily exert a desired function is obtained.

[Near-Infrared Reflecting Film]

The near-infrared reflecting film employable in the present invention is a film having an ability to reflect near-infrared rays. Examples of such near-infrared reflecting films include an aluminum deposited film, a precious metal thin film, a resin film in which metal oxide fine particles containing indium oxide as a main component and containing a small amount of tin oxide are dispersed, and a dielectric multilayer film in which a high-refractive index material layer and a low-refractive index material layer are alternately laminated.

In the present invention, the near-infrared reflecting film may be provided on one surface of the resin substrate, or may be provided on both surfaces thereof. When it is provided on one surface, production cost and ease of production are excellent, and when it is provided on both surfaces, an optical filter having high strength and rarely suffering warpage can be obtained.

Of the above near-infrared reflecting films, the dielectric multilayer film in which a high-refractive index material layer and a low-refractive index material layer are alternately laminated is more preferable.

As the material to form the high-refractive index material layer, a material having a refractive index of not less than 1.7 can be used, and a material usually having a refractive index in the range of 1.7 to 2.5 is selected. Such a material is, for example, a material containing titanium oxide, zirconium oxide, tantalum pentaoxide, niobium pentaoxide, lanthanum oxide, yttrium oxide, zinc oxide, zinc sulfide or indium oxide as a main component and containing titanium oxide, tin oxide and/or cerium oxide in a small amount (e.g., 0 to 10% based on the main component).

As the material to form the low-refractive index material layer, a material having a refractive index of not more than 1.6 can be used, and a material usually having a refractive index in the range of 1.2 to 1.6 is selected. Examples of such materials include silica, alumina, lanthanum fluoride, magnesium fluoride and aluminum sodium hexafluoride.

The method for laminating the high-refractive index material layer and the low-refractive index material layer is not specifically restricted as far as a dielectric multilayer film wherein these layers are laminated is formed. For example, the dielectric multilayer film can be formed by alternately laminating the high-refractive index material layer and the low-refractive index material layer directly on the aforesaid resin substrate through CVD method, sputtering, vacuum deposition, ion-assisted deposition, ion plating or the like.

When the near-infrared wavelength to be cut is taken as λ (nm), the thickness of each of the high-refractive index material layer and the low-refractive index material layer is preferably 0.1λ to 0.5λ. When the thickness is in this range, the optical film thickness calculated as a product (n×d) of the refractive index (n) and the film thickness (d), which is λ/4, and the thickness of each of the high-refractive index material layer and the low-refractive index material layer become almost the same as each other, and from the relationship between the optical properties of reflection and refraction, cutting/transmission of a specific wavelength tends to be able to be easily controlled.

The total number of laminated layers of the high-refractive index material layers and the low-refractive index material layers in the dielectric multilayer film is desired to be 5 to 60, preferably 10 to 50.

In the case where warpage takes place in the substrate when the dielectric multilayer film is formed, a method of forming the dielectric multilayer film on both surfaces of the substrate, a method of irradiating the substrate surface where the dielectric multilayer film has been formed with electromagnetic waves such as ultraviolet rays, or the like can be adopted in order to cope with the warpage. When the substrate surface is irradiated with the electromagnetic waves, the irradiation may be carried out during formation of the dielectric multilayer film or may be carried out after the formation.

[Other Functional Films]

For the purpose of enhancing surface hardness of the resin substrate or the near-infrared reflecting film, enhancing chemical resistance, preventing static electrification, removing flaws, etc., functional films, such as an antireflection film, a hard coating film and an antistatic film, can be properly provided between the resin substrate and the near-infrared reflecting film such as a dielectric multilayer film or on a surface of the resin substrate opposite to the surface where the near-infrared reflecting film has been provided or on a surface of the near-infrared reflecting film opposite to the surface where the resin substrate has been provided.

The optical filter of the present invention may include one layer composed of the above functional film or may include two or more layers each of which is composed of the functional film. When the optical filter of the present invention includes two or more layers each of which is composed of the functional film, it may include two or more layers which are the same as one another or may include two or more layers which are different from one another.

Although the method for laminating the functional film is not specifically restricted, there can be mentioned a method of melt molding or cast molding coating agents, such as an antireflection agent, a hard coating agent and/or an antistatic agent, on the resin substrate or the near-infrared reflecting film in the same manner as previously described.

The functional film can be produced also by applying a curable composition containing the coating agent, etc. onto the resin substrate or the infrared reflecting film using a bar coater or the like and then curing the composition through ultraviolet light irradiation or the like.

As the coating agent, an ultraviolet (UV)/electron beam (EB) curable resin, a thermosetting resin or the like can be mentioned, and specific examples thereof include vinyl compounds, and urethane-based, urethane acrylate-based, acrylate-based, epoxy-based and epoxy acrylate-based resins. Examples of the curable compositions containing these coating agents include vinyl-based, urethane-based, urethane acrylate-based, acrylate-based, epoxy-based and epoxy acrylate-based curable compositions.

The curable composition may contain a polymerization initiator. As the polymerization initiator, a publicly known photopolymerization initiator or thermal polymerization initiator can be used, and a photopolymerization initiator and a thermal polymerization initiator may be used in combination. Such polymerization initiators may be used singly, or may be used in combination of two or more kind.

When the total amount of the curable composition is 100% by weight, the blending ratio of the polymerization initiator in the curable composition is preferably 0.1 to 10% by weight, more preferably 0.5 to 10% by weight, still more preferably 1 to 5% by weight. When the blending ratio of the polymerization initiator is in the above range, the curable composition is excellent in curing property and handling property, and a functional film having a desired hardness, such as an antireflection film, a hard coating film or an antistatic film, can be obtained.

To the curable composition, an organic solvent may be further added as a solvent, and as the organic solvent, a publicly known solvent can be used. Specific examples of the organic solvents include alcohols, such as methanol, ethanol, isopropanol, butanol and octanol; ketones, such as acetone, methyl ethyl ketone, methyl isobutyl ketone and cyclohexanone; esters, such as ethyl acetate, butyl acetate, ethyl lactate, γ-butyrolactone, propylene glycol monomethyl ether acetate and propylene glycol monoethyl ether acetate; ethers, such as ethylene glycol monomethyl ether and diethylene glycol monobutyl ether; aromatichydrocarbons, such as benzene, toluene andxylene; andamides, such as dimethylformamide, dimethylacetamide and N-methylpyrrolidone. These solvents may be used singly, or may be used in combination of two or more kinds.

The thickness of the functional film is preferably 0.1 μm to 20 μm, more preferably 0.5 μm to 10 μm, particularly preferably 0.7 μm to 5 μm.

For the purpose of enhancing adhesion between the resin substrate and the functional film and/or the near-infrared reflecting film or adhesion between the functional film and the near-infrared reflecting film, the surface of the resin substrate or the functional film may be subjected to surface treatment, such as corona treatment or plasma treatment.

[Characteristics, Etc. of Optical Filter]

The optical filter of the present invention has the resin substrate. On this account, the optical filter of the present invention is excellent in transmittance property and is not limited when used. Further, since the squarylium-based compound and the cyanine-based compound contained in the resin substrate each have an absorption maximum in the wavelength region of 600 to 800 nm, they can absorb near-infrared light efficiently, and by virtue of combination with the near-infrared reflecting film, an optical filter having small incident angle dependence can be obtained.

In the optical filter of the present invention, the squarylium-based compound and the cyanine-based compound are used, and thereby, favorable absorption property and visible light transmittance are compatible with each other, the incident angle dependence can be reduced, and the scattered light intensity can be lowered. It is known that the squarylium-based compound generally emits fluorescence during light absorption, and by using it in combination with the cyanine-based compound, reabsorption of fluorescence becomes possible, and as a result, the scattered light intensity observed can be lowered. When the quantity of the transmitted light of the baseline in the spectrometry is 100%, the scattered light intensity observed in the measurement using an optical filter sample is preferably not more than 0.50%, particularly preferably not more than 0.35%. When the scattered light intensity is in this range, a favorable camera image free from a blur of image can be obtained.

[Uses of Optical Filter]

The optical filter of the present invention has a wide viewing angle and has excellent near-infrared cutting ability, etc. Therefore, the optical filter is useful for correction of visibility of a sold-state image sensor, such as CCD or CMOS image sensor of camera module. In particular, it is useful for digital still camera, camera for cellular phone, digital video camera, PC camera, surveillance camera, camera for automobile, TV, car navigation system, personal digital assistant, personal computer, video game console, handheld game console, fingerprint authentication system, digital music player, etc. Moreover, the optical filter is useful also as a heat ray cut filter mounted on glass of automobile, building or the like.

<Solid-State Image Pickup Device>

The solid-state image pickup device of the present invention is equipped with the optical filter of the present invention. Here, the solid-state image pickup device is an image sensor having a solid-state image sensor, such as CCD or CMOS image sensor, and is specifically used for digital still camera, camera for cellular phone, digital video camera, etc.

<Camera Module>

The camera module of the present invention is equipped with the optical filter of the present invention. Here, use of the optical filter of the present invention for a camera module is specifically described. In FIG. 1, sectional schematic views of camera modules are shown.

FIG. 1(a) is a sectional schematic view of a structure of a conventional camera module, and FIG. 1(b) is a sectional schematic view showing one structure of a camera module, said structure being able to taken in the case where the optical filter 6' of the present invention is used. In FIG. (1)b, the optical filter 6' of the present invention is used above a lens 5. However, the optical filter 6' of the present invention can be also used between a lens 5 and a sensor 7, as shown in FIG. 1(a).

In the conventional camera module, light 10 needs to be incident approximately perpendicularly to the optical filter 6. On that account, the filter 6 needs to be arranged between the lens 5 and the sensor 7.

Since the sensor 7 is highly sensitive, there is a fear that it does not work correctly even by the contact of dust or dirt of about 5 μm. Therefore, the filter 6 used above the sensor 7 needs to be a filter which is free from dust or dirt and contains no foreign matters. Further, from the viewpoints of characteristics of the sensor 7, it is necessary to provide a given space between the filter 6 and the sensor 7, and this has contributed to hindrance to lowering of height of the camera module.

On the other hand, in the case of the optical filter 6' of the present invention, there is no large difference in transmission wavelength between the light that is incident perpendicularly to the filter 6' and the light that is incident at an angle of 30° to the perpendicular direction to the filter 6' (that is, the dependence of the absorption (transmission) wavelength on the incident angle is small). Therefore, there is no need to arrange the filter 6' between the lens 5 and the sensor 7, and the filter 6' can be arranged above the lens.

On this account, when the optical filter 6' of the present invention is used for a camera module, handling of the cameral module is facilitated, and there is no need to provide a given space between the filter 6' and the sensor 7, so that lowering of height of the camera module becomes possible.

EXAMPLES

The present invention is more specifically described with reference to the following examples, but it should be construed that the present invention is in no way limited to those examples. The term "part(s)" means "part(s) by weight" unless otherwise noted. Methods for measuring property values and methods for evaluating properties are as follows.

<Molecular Weight>

Taking into consideration the solubility of each resin in a solvent, etc., a molecular weight of the resin was measured by the following method (a) or (b).

(a) Using a gel permeation chromatography (GPC) apparatus (150C type, column: H type column available from Tosoh Corporation, developing solvent: o-dichlorobenzene) manufactured by WATERS Corporation, a weight-average molecular weight (Mw) and a number-average molecular weight (Mn) in terms of standard polystyrene were measured.

(b) Using a GPC apparatus (HLC-8220 type, column: TSKgel α-M, developing solvent: THF) manufactured by Tosoh Corporation, a weight-average molecular weight (Mw) and a number-average molecular weight (Mn) in terms of standard polystyrene were measured.

With regard to the resin synthesized in the later-described Resin Synthesis Example 3, measurement of a molecular weight by the above method was not carried out, but measurement of an inherent viscosity by the following method (c) was carried out.

(c) A part of a polyimide resin solution was introduced into anhydrous methanol to precipitate a polyimide resin, and filtration was carried out to separate the resin from an unreacted monomer. Then, 0.1 g of polyimide obtained by vacuum drying the resulting resin at 80° C. for 12 hours was dissolved in 20 mL of N-methyl-2-pyrrolidone, and an inherent viscosity (μ) at 30° C. was determined using a Cannon-Fenske viscometer and the following formula.

$$\mu = \{\ln(t_s/t_0)\}/C$$

$t_0$: flow time of solvent
$t_s$: flow time of dilute polymer solution
C: 0.5 g/dL <Glass Transition Temperature (Tg)>

Using a differential scanning Calorimeter (DSC 6200) manufactured by SII Nanotechnology Inc., a glass transition temperature was measured at a heating rate of 20° C./min in a stream of nitrogen.

<Spectral Transmittance>

Using a spectrophotometer (U-4100) manufactured by Hitachi High-Tech Science Corporation, an absorption maximum, a transmittance in each wavelength region, (Xa) and (Xb) were measured.

Figure 2:
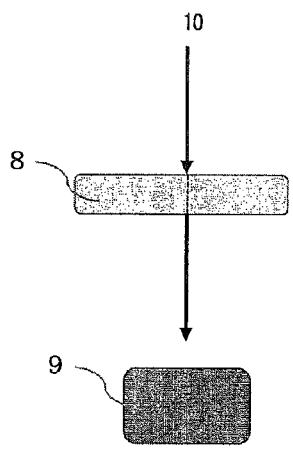
FIG. 2 is a schematic view showing a method for measuring a transmittance in the case where the transmittance is measured in the perpendicular direction to an optical filter.
Figure 3:
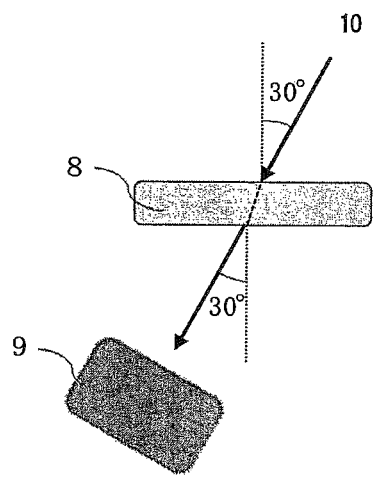
FIG. 3 is a schematic view showing a method for measuring a transmittance in the case where the transmittance is measured at an angle of 30° to the perpendicular direction to an optical filter.

Here, with regard to the transmittance measured in the perpendicular direction to the optical filter, a transmittance of light transmitted perpendicularly to the filter was measured, as shown in FIG. 2. With regard to the transmittance measured at an angle of 30° to the perpendicular direction to the optical filter, a transmittance of light transmitted at an angle of 30° to the perpendicular direction to the filter was measured, as shown in FIG. 3.

This transmittance was a transmittance measured by the use of the spectrophotometer under such conditions that the light is incident perpendicularly to the substrate and the filter, except the case of measurement of (Xb). In the case of measurement of (Xb), the transmittance was a transmittance measured by the use of the spectrophotometer under such conditions that the light is incident at an angle of 30° to the perpendicular direction to the filter.

<Scattered Light Intensity>

Using a spectrophotometer (U-4100) manufactured by Hitachi High-Tech Science Corporation, a mean intensity of scattered light in the wavelength region of 700 nm to 715 nm was measured.

Figure 4:
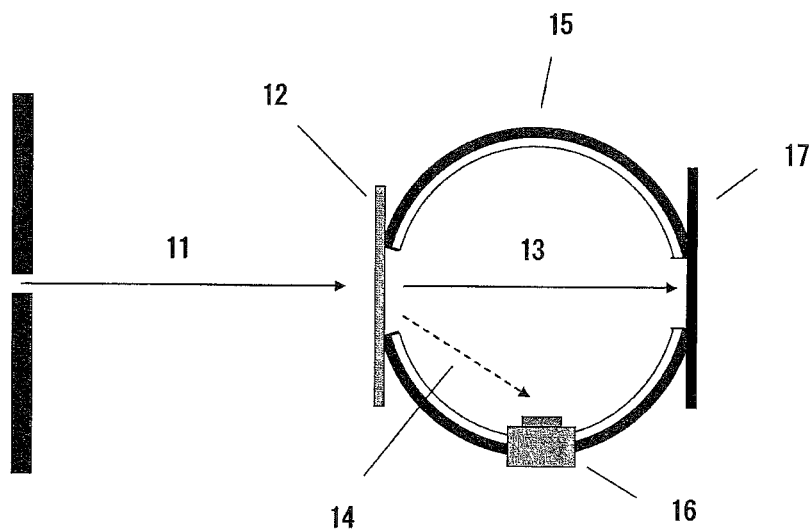
FIG. 4 is a schematic view showing a method for measuring an intensity of scattered light.

In the measurement of a scattered light intensity, a part of an integrating sphere of the spectrophotometer was replaced with a carbon feather sheet of black color exhibiting little light reflection so that the light beam having entered the integrating sphere should not be reflected or scattered inside the integrating sphere, as shown in FIG. 4. By adopting such a measuring method, the intensity of light scattered on the optical filter portion can be measured. In the scattered light that is measurable herein, not only the light physically scattered on the optical filter portion but also fluorescence emitted by the squarylium-based compound during light absorption is contained.

Synthesis Examples

Squarylium-based compounds, phthalocyanine-based compounds, cyanine-based compounds, near-ultraviolet absorbing agents and other dyes used in the following examples can be synthesized by methods generally known, and for example, they can be synthesized referring to the methods described in Japanese Patent No. 3366697, Japanese Patent No. 2846091, Japanese Patent No. 2864475, Japanese Patent No. 3703869, Japanese Patent Laid-Open Publication No. 1985-228448, Japanese Patent Laid-Open Publication No. 1989-146846, Japanese Patent Laid-Open Publication No. 1989-228960, Japanese Patent No. 4081149, Japanese Patent Laid-Open Publication No. 1988-124054, "Phthalocyanine-Chemistry and Functions-" (IPC, 1997), Japanese Patent Laid-Open Publication No. 2007-169315, Japanese Patent Laid-Open Publication No. 2009-108267, Japanese Patent Laid-Open Publication No. 2010-241873, Japanese Patent No. 3699464, Japanese Patent No. 4740631, etc.

Resin Synthesis Example 1

In a reaction container purged with nitrogen, 100 parts of 8-methyl-8-methoxycarbonyltetracyclo[4.4.0.1$^{2,5}$.1$^{7,10}$]dodec-3-ene (also referred to as "DNM" hereinafter) represented by the following formula (a), 18 parts of 1-hexene (molecular weight modifier) and 300 parts of toluene (solvent for ring-opening polymerization reaction) were placed, and this solution was heated to 80° C. Then, to the solution in the reaction container, 0.2 part of a toluene solution of triethylaluminum (0.6 mol/liter) and 0.9 part of a toluene solution of methanol-modified tungsten hexachloride (concentration: 0.025 mol/liter) were added as polymerization catalysts, and the resulting solution was heated and stirred at 80° C. for 3 hours to perform ring-opening polymerization reaction, whereby a ring-opened polymer solution was obtained. The polymerization conversion ratio in this polymerization reaction was 97%.

(a)

In an autoclave, 1,000 parts of the ring-opened polymer solution obtained as above were placed, and to this ring-opened polymer solution, 0.12 part of RuHCl (CO)[P(C$_6$H$_5$)$_3$]$_3$ was added, and they were heated and stirred for 3 hours under the conditions of a hydrogen gas pressure of 100 kg/cm$^2$ and a reaction temperature of 165° C. to perform hydrogenation reaction.

After the resulting reaction solution (hydrogenated polymer solution) was cooled, the hydrogen gas pressure was released. This reaction solution was poured into a large amount of methanol, and the resulting precipitate was separated and recovered. Then, the precipitate was dried to obtain a hydrogenated polymer (also referred to as a "resin A" hereinafter). The resulting resin A had a number-average molecular weight (Mn) of 32,000, a weight-average molecular weight (Mw) of 137,000 and a glass transition temperature (Tg) of 165° C.

Resin Synthesis Example 2

In a 3-liter four-neck flask, 35.12 g (0.253 mol) of 2,6-difluorobenzonitrile, 87.60 g (0.250 mol) of 9,9-bis(4-hydroxyphenyl)fluorene, 41.46 g (0.300 mol) of potassium carbonate, 443 g of N, N-dimethylacetamide (also referred to as "DMAc" hereinafter) and 111 g of toluene were placed. Subsequently, to the four-neck flask, a thermometer, a stirrer, a three-way cock with a nitrogen feed pipe, a Dean-Stark tube and a cooling pipe were fixed.

Then, the flask was purged with nitrogen. Thereafter, the resulting solution was subjected to reaction at 140° C. for 3 hours, and water produced was removed from the Dean-Stark tube whenever necessary. When production of water came to be not detected, the temperature was slowly raised up to 160° C., and the reaction was carried out at the same temperature for 6 hours.

After the reaction solution was cooled down to room temperature (25° C.), a salt produced was removed by a filter paper, then the filtrate was introduced into methanol to perform reprecipitation, and filtration was carried out to isolate a filter residue (residue). The resulting filter residue was vacuum dried at 60° C. for one night to obtain a white powder (also referred to as a "resin B" hereinafter) (yield: 95%). The resulting resin B had a number-average molecular weight (Mn) of 75,000, a weight-average molecular weight (Mw) of 188,000 and a glass transition temperature (Tg) of 285° C.

Resin Synthesis Example 3

In a 500-mL five-neck flask equipped with a thermometer, a stirrer, a nitrogen feed pipe, a dropping funnel with a side tube, a Dean-Stark tube and a cooling pipe, 27.66 g (0.08 mol) of 1,4-bis(4-amino-α,α-dimethylbenzyl)benzene and 7.38 g (0.02 mol) of 4,4'-bis(4-aminophenoxy) biphenyl were placed in a stream of nitrogen, and they were dissolved in 68.65 g of γ-butyrolactone and 17.16 g of N,N-dimethylacetamide. The resulting solution was cooled to 5° C. using an ice water bath, and with maintaining the solution at the same temperature, 22.62 g (0.1 mol) of 1,2,4,5-cyclohexanetetracarboxylic dianhydride and 0.50 g (0.005 mol) of triethylamine as an imdization catalyst were added all together. After the addition was completed, the temperature was raised to 180° C., and with removing the distillate whenever necessary, the reaction solution was refluxed for 6 hours. After the reaction was completed, air cooling was carried out until the internal temperature became 100° C. Thereafter, 143.6 g of N,N-dimethylacetamide was added to dilute the reaction solution, and with stirring, the resulting solution was cooled to obtain 264.16 g of a polyimide resin solution having a solid concentration of 20% by weight. A part of the polyimide resin solution was poured into 1 liter of methanol to precipitate polyimide. The polyimide was filtered off, washed with methanol and then dried for 24 hours in a vacuum dryer at 100° C. to obtain a white powder (also referred to as a "resin C" hereinafter). When an IR spectrum of the resulting resin C was measured, absorption at 1704 cm$^{-1}$ and 1770 cm$^{-1}$ characteristic of an imide group was observed. The resin C had a glass transition temperature (Tg) of 310° C., and the inherent viscosity measurement resulted in 0.87.

Resin Synthesis Example 4

In a 50-liter reactor equipped with a stirrer and a distillation device, 9.167 kg (20.90 mol) of 9,9-bis(4-(2-hydroxyethoxy)phenyl) fluorene, 4.585 kg (20.084 mol) of bisphenol A, 9.000 kg (42.01 mol) of diphenyl carbonate and 0.02066 kg (2.459×10$^{-4}$ mol) of sodium hydrogencarbonate were placed, and they were heated and stirred at 215° C. over a period of 1 hour at 760 Torr in a nitrogen atmosphere. Thereafter, the degree of vacuum was adjusted to 150 Torr over a period of 15 minutes, and the system was maintained for 20 minutes under the conditions of 215° C. and 150 Torr to perform transesterification reaction. Further, the temperature was raised up to 240° C. at a rate of 37.5° C./hr, and the system was maintained at 240° C. and 150 Torr for 10 minutes. Thereafter, the system was adjusted to 120 Torr over a period of 10 minutes, and was maintained at 240° C. and 120 Torr for 70 minutes. Thereafter, the system was adjusted to 100 Torr over a period of 10 minutes, and was maintained at 240° C. and 100 Torr for 10 minutes. Further, the system was adjusted to not more than 1 Torr over a period of 40 minutes, and stirring was carried out for 10 minutes under the conditions of 240° C. and 1 Torr to perform polymerization reaction. After the reaction was completed, nitrogen was fed to the reactor to pressurize the reactor, and with pelletizing the resulting polycarbonate resin (also referred to as a "resin D" hereinafter), the pellets were taken out. The resulting resin D had a weight-average molecular weight of 41,000 and a glass transition temperature (Tg) of 152° C.

Resin Synthesis Example 5

In a reactor, 0.8 mol of 9,9-bis{4-(2-hydroxyethoxy)-3,5-dimethylphenyl}fluorene, 2.2 mol of ethylene glycol and 1.0 mol of dimethyl isophthalate were placed, and with stirring, they were slowly heated and melted to perform transestrification reaction. Thereafter, 20×10$^{-4}$ mol of germanium oxide was added, and with slowly carrying out elevation of temperature and reduction of pressure until a temperature of 290° C. and a pressure of not more than 1 Torr were reached, ethylene glycol was removed. Thereafter, the contents were taken out of the reactor to obtain pellets of a polyester resin (also referred to as a "resin E" hereinafter). The resulting resin E had a number-average molecular weight of 40,000 and a glass transition temperature of 145° C.

Resin Synthesis Example 6

In a reactor equipped with a thermometer, a cooling pipe, a gas feed pipe and a stirrer, 16.74 parts of 4,4'-bis(2,3,4,5,6-pentafluorobenzoyl)diphenyl ether (BPDE), 10.5 parts of 9,9-bis(4-hydroxyphenyl) fluorene (HF), 4.34 parts of potassium carbonate and 90 parts of DMAc were placed. This mixture was heated to 80° C. and subjected to reaction for 8 hours. After the reaction was completed, the reaction solution was added to a 1% acetic acid aqueous solution with vigorously stirring by a blender. The reaction product precipitated was filtered off, washed with distilled water and methanol and then vacuum dried to obtain fluorinated polyether ketone (also referred to as a "resin F" hereinafter). The resulting resin F had a number-average molecular weight of 71,000 and a glass transition temperature (Tg) of 242° C.

Example A1

In a container, 100 parts by weight of the resin A obtained in Synthesis Example 1, 0.03 part by weight of a squarylium-based compound (a-16), 0.01 part by weight of a phthalocyanine-based compound (b-11) and methylene chloride were placed to obtain a solution (ex1) having a resin concentration of 20% by weight. Then, the resulting solution was cast onto a smooth glass plate and dried at 20° C. for 8 hours, and thereafter, the resulting coating film was peeled off from the glass plate. The coating film thus peeled off was further dried at 100° C. for 8 hours under reduced pressure to obtain a substrate having a thickness of 0.1 mm, a length of 60 mm and a width of 60 mm.

A spectral transmittance of this substrate was measured, and an absorption maximum wavelength, a transmittance at the absorption maximum wavelength and a transmittance in the visible wavelength region were determined. The results are set forth in Table 10 and Table 11.

Subsequently, on one surface of the resulting substrate, a multilayer deposited film [silica (SiO$_2$, thickness: 83 to 199 nm) layer and titania (TiO$_2$, thickness: 101 to 125 nm) layer were alternately laminated, number of layers laminated: 20], which reflected near-infrared rays at a deposition temperature of 100° C., was formed, and on the other surface of the substrate, a multilayer deposited film [silica (SiO$_2$, thickness: 77 to 189 nm) layer and titania (TiO$_2$, thickness: 84 to 118 nm) layer were alternately laminated, number of layers laminated: 26], which reflected near-infrared rays at a deposition temperature of 100° C., was formed, whereby an optical filter having a thickness of 0.105 mm was obtained. A spectral transmittance of this optical filter was measured, and optical properties in each wavelength region were evaluated. The results are set forth in Table 10.

The mean transmittance in the wavelength region of 430 to 580 nm was 91%, and the mean transmittance in the wavelength region of 800 to 1000 nm was 1% or less.

Example A2

On one surface of the substrate having a thickness of 0.1 mm, a length of 60 mm and a width of 60 mm, which had been obtained in Example A1, a multilayer deposited film [silica (SiO$_2$, thickness 120 to 190 nm) layer and titania (TiO$_2$, thickness: 70 to 120 nm) layer were alternately laminated, number of layers laminated: 40], which reflected near-infrared rays at a deposition temperature of 100° C., was formed to produce an optical filter having a thickness of 0.104 mm, and the optical filter was evaluated. The results are set forth in Table 10.

[Example A3] to [Example A23] and [Comparative Example A1] to [Comparative Example A6]

Optical filters each having a thickness of 0.105 mm were produced in the same manner as in Example A1, except that the resins, the solvents, the dyes and the film drying conditions shown in Table 9 were adopted. The conditions for producing optical filters are set forth in Table 9, and the evaluation results are set forth in Table 10 and Table 11. In Table 9, the amount of each resin added is 100 parts by weight, and the concentration of each resin solution is 20% by weight. various compounds other than the resins A to F, the squarylium-based compounds and the phthalocyanine-based compounds, and solvents used in the examples and the comparative examples are as follows.

Resin G: cyclic olefin-based resin "ZEONOR 1420R" (available from Zeon Corporation)
Resin H: cyclic olefin-based resin "APEL #6015" (available from Mitsui Chemicals, Inc.)
Resin I: polycarbonate-based resin "PURE-ACE" (available from Teij in Limited)
Resin J: polyether sulfone-based resin "SUMILITE FS-1300" (available from Sumitomo Bakelite Co., Ltd.)
Resin K: heat-resistant acrylic resin "ACRIVIEWA" (available from Nippon Shokubai Co., Ltd.)
Solvent (1): methylene chloride
Solvent (2): N,N-dimethylacetamide
Solvent (3): ethyl acetate/toluene (ratio by weight: 5/5)
Solvent (4): cyclohexane/xylene (ratio by weight: 7/3)
Solvent (5): cyclohexane/methylene chloride (ratio by weight: 99/1)
Solvent (6): N-methyl-12-pyrrolidone
Compound (11): triazine-based compound represented by the following formula (11)
Compound (12): indole-based compound represented by the following formula (12)
Compound (13): nickel complex compound represented by the following formula (13)
Compound (14): cyanine-based compound represented by the following formula (14)

The film drying conditions in the examples and the comparative examples in Table 9 are as follows.
Conditions (1): 20° C./8 hr→100° C./8 hr under reduced pressure
Conditions (2): 60° C./8 hr→80° C./8 hr→140° C./8 hr under reduced pressure
Conditions (3): 60° C./8 hr→80° C./8 hr→100° C./24 hr under reduced pressure
Conditions (4): 40° C./4 hr→60° C./4 hr→100° C./8 hr under reduced pressure

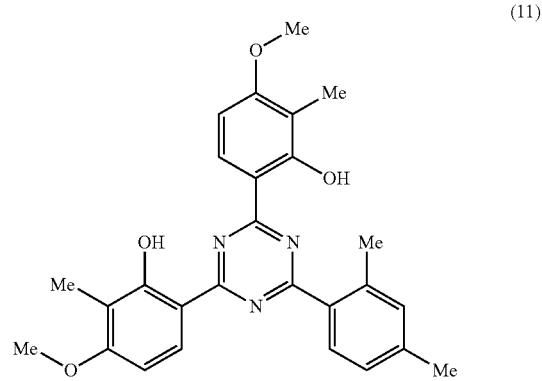

(11)

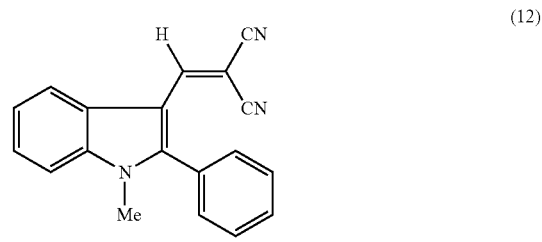

(12)

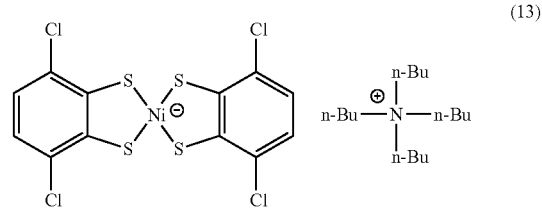

(13)

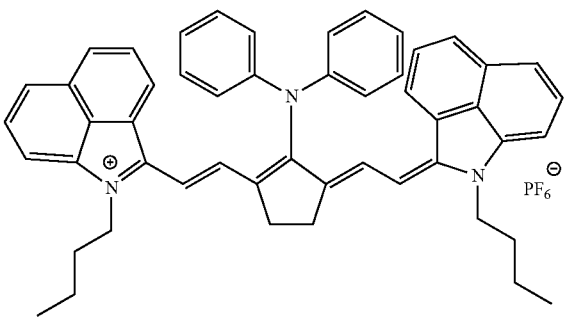

(14)

TABLE 9

| | Composition of resin solution | | | |
|---|---|---|---|---|
| | Resin | Solvent | Squarylium-based compound | Phthalocyanine-based compound |
| Ex. A1 | resin A | solvent (1) | (a-16) 0.03 part by weight | (b-11) 0.01 part by weight |
| Ex. A2 | resin A | solvent (1) | (a-16) 0.03 part by weight | (b-11) 0.01 part by weight |
| Ex. A3 | resin A | solvent (1) | (a-16) 0.03 part by weight | (b-3) 0.01 part by weight |
| Ex. A4 | resin A | solvent (1) | (a-16) 0.03 part by weight | (b-20) 0.01 part by weight |
| Ex. A5 | resin A | solvent (1) | (a-22) 0.03 part by weight | (b-4) 0.01 part by weight |
| Ex. A6 | resin A | solvent (1) | (a-22) 0.03 part by weight | (b-11) 0.01 part by weight |
| Ex. A7 | resin A | solvent (1) | (a-33) 0.03 part by weight | (b-16) 0.02 part by weight |
| Ex. A8 | resin A | solvent (1) | (a-8) 0.03 part by weight | (b-47) 0.01 part by weight |

TABLE 9-continued

| | | | | |
|---|---|---|---|---|
| Ex. A9 | resin A | solvent (1) | (a-16) 0.03 part by weight | (b-11) 0.01 part by weight |
| Ex. A10 | resin A | solvent (1) | (a-16) 0.03 part by weight | (b-11) 0.01 part by weight |
| Ex. A11 | resin B | solvent (1) | (a-16) 0.03 part by weight | (b-11) 0.01 part by weight |
| Ex. A12 | resin B | solvent (1) | (a-16) 0.03 part by weight | (b-3) 0.01 part by weight |
| Ex. A13 | resin B | solvent (1) | (a-8) 0.03 part by weight | (b-11) 0.02 part by weight |
| Ex. A14 | resin B | solvent (1) | (a-22) 0.03 part by weight | (b-16) 0.01 part by weight |
| Ex. A15 | resin C | solvent (2) | (a-16) 0.03 part by weight | (b-11) 0.01 part by weight |
| Ex. A16 | resin D | solvent (1) | (a-16) 0.03 part by weight | (b-11) 0.01 part by weight |
| Ex. A17 | resin E | solvent (1) | (a-16) 0.03 part by weight | (b-11) 0.01 part by weight |
| Ex. A18 | resin F | solvent (3) | (a-16) 0.03 part by weight | (b-11) 0.01 part by weight |
| Ex. A19 | resin G | solvent (4) | (a-16) 0.03 part by weight | (b-11) 0.01 part by weight |
| Ex. A20 | resin H | solvent (5) | (a-16) 0.03 part by weight | (b-11) 0.01 part by weight |
| Ex. A21 | resin I | solvent (1) | (a-16) 0.03 part by weight | (b-11) 0.01 part by weight |
| Ex. A22 | resin J | solvent (6) | (a-16) 0.03 part by weight | (b-11) 0.01 part by weight |
| Ex. A23 | resin K | solvent (1) | (a-16) 0.03 part by weight | (b-11) 0.01 part by weight |
| Comp. Ex. A1 | resin A | solvent (1) | — | — |
| Comp. Ex. A2 | resin A | solvent (1) | — | — |
| Comp. Ex. A3 | resin A | solvent (1) | — | — |
| Comp. Ex. A4 | resin A | solvent (1) | (a-16) 0.04 part by weight | — |
| Comp. Ex. A5 | resin A | solvent (1) | — | (b-11) 0.04 part by weight |
| Comp. Ex. A6 | resin A | solvent (1) | (a-16) 0.03 part by weight | — |

| | Composition of resin solution Other compounds | Film drying conditions | Constitution of multilayer deposited film |
|---|---|---|---|
| Ex. A1 | — | condition (1) | both surfaces (20 layers + 26 layers) |
| Ex. A2 | — | condition (1) | one surface 40 layers |
| Ex. A3 | — | condition (1) | both surfaces (20 layers + 26 layers) |
| Ex. A4 | — | condition (1) | both surfaces (20 layers + 26 layers) |
| Ex. A5 | — | condition (1) | both surfaces (20 layers + 26 layers) |
| Ex. A6 | — | condition (1) | both surfaces (20 layers + 26 layers) |
| Ex. A7 | — | condition (1) | both surfaces (20 layers + 26 layers) |
| Ex. A8 | — | condition (1) | both surfaces (20 layers + 26 layers) |
| Ex. A9 | compound(11) 0.40 part by weight | condition (1) | both surfaces (20 layers + 26 layers) |
| Ex. A10 | compound(11) 0.40 part by weight compound(12) 0.10 part by weight | condition (1) | both surfaces (20 layers + 26 layers) |
| Ex. A11 | — | condition (1) | both surfaces (20 layers + 26 layers) |
| Ex. A12 | — | condition (1) | both surfaces (20 layers + 26 layers) |
| Ex. A13 | — | condition (1) | both surfaces (20 layers + 26 layers) |
| Ex. A14 | — | condition (1) | both surfaces (20 layers + 26 layers) |
| Ex. A15 | — | condition (2) | both surfaces (20 layers + 26 layers) |
| Ex. A16 | — | condition (1) | both surfaces (20 layers + 26 layers) |
| Ex. A17 | — | condition (1) | both surfaces (20 layers + 26 layers) |
| Ex. A18 | — | condition (2) | both surfaces (20 layers + 26 layers) |
| Ex. A19 | — | condition (3) | both surfaces (20 layers + 26 layers) |
| Ex. A20 | — | condition (4) | both surfaces (20 layers + 26 layers) |
| Ex. A21 | — | condition (1) | both surfaces (20 layers + 26 layers) |
| Ex. A22 | — | condition (2) | both surfaces (20 layers + 26 layers) |
| Ex. A23 | — | condition (1) | both surfaces (20 layers + 26 layers) |
| Comp. Ex. A1 | — | condition (1) | both surfaces (20 layers + 26 layers) |
| Comp. Ex. A2 | compound(13) 0.50 part by weight | condition (1) | both surfaces (20 layers + 26 layers) |
| Comp. Ex. A3 | compound(14) 0.04 part by weight | condition (1) | both surfaces (20 layers + 26 layers) |
| Comp. Ex. A4 | — | condition (1) | both surfaces (20 layers + 26 layers) |
| Comp. Ex. A5 | — | condition (1) | both surfaces (20 layers + 26 layers) |
| Comp. Ex. A6 | compound(13) 0.10 part by weight | condition (1) | both surfaces (20 layers + 26 layers) |

TABLE 10

| | Transparent resin substrate Absorption maximum wavelength | Optical filter | | | |
|---|---|---|---|---|---|
| | | Mean value of transmittances in wavelength region of 430 nm to 580 nm | Mean value of transmittances in wavelength region of 800 nm to 1000 nm | \|Xa-Xb\| | Scattered light intensity in wavelength region of 700 nm to 715 nm |
| Ex. A1 | 698 nm | 91% | 1% or less | 3 nm | 0.21% |
| Ex. A2 | 698 nm | 91% | 1% or less | 3 nm | 0.21% |
| Ex. A3 | 703 nm | 90% | 1% or less | 3 nm | 0.20% |
| Ex. A4 | 700 nm | 90% | 1% or less | 4 nm | 0.20% |
| Ex. A5 | 674 nm | 89% | 1% or less | 4 nm | 0.20% |
| Ex. A6 | 673 nm | 89% | 1% or less | 4 nm | 0.21% |
| Ex. A7 | 676 nm | 89% | 1% or less | 5 nm | 0.23% |
| Ex. A8 | 688 nm | 90% | 1% or less | 4 nm | 0.21% |
| Ex. A9 | 360 nm, 698 nm | 91% | 1% or less | 3 nm | 0.22% |
| Ex. A10 | 364 nm, 698 nm | 91% | 1% or less | 3 nm | 0.22% |
| Ex. A11 | 706 nm | 88% | 1% or less | 5 nm | 0.22% |
| Ex. A12 | 710 nm | 87% | 1% or less | 4 nm | 0.23% |
| Ex. A13 | 699 nm | 87% | 1% or less | 6 nm | 0.24% |
| Ex. A14 | 684 nm | 87% | 1% or less | 6 nm | 0.23% |
| Ex. A15 | 708 nm | 87% | 1% or less | 5 nm | 0.24% |
| Ex. A16 | 705 nm | 87% | 1% or less | 6 nm | 0.23% |
| Ex. A17 | 707 nm | 88% | 1% or less | 5 nm | 0.24% |
| Ex. A18 | 706 nm | 87% | 1% or less | 6 nm | 0.24% |
| Ex. A19 | 697 nm | 90% | 1% or less | 4 nm | 0.22% |
| Ex. A20 | 699 nm | 89% | 1% or less | 4 nm | 0.21% |
| Ex. A21 | 706 nm | 87% | 1% or less | 5 nm | 0.21% |
| Ex. A22 | 712 nm | 87% | 1% or less | 7 nm | 0.24% |
| Ex. A23 | 697 nm | 91% | 1% or less | 5 nm | 0.24% |
| Comp. Ex. A1 | none | 92% | 1% or less | 25 nm | 0.06% |
| Comp. Ex. A2 | 847 nm | 86% | 1% or less | 24 nm | 0.07% |
| Comp. Ex. A3 | 998 nm | 85% | 1% or less | 24 nm | 0.06% |
| Comp. Ex. A4 | 698 nm | 91% | 1% or less | 3 nm | 0.63% |
| Comp. Ex. A5 | 695 nm | 91% | 1% or less | 18 nm | 0.04% |
| Comp. Ex. A6 | 700 nm, 847 nm | 88% | 1% or less | 5 nm | 0.61% |

TABLE 11

| | Transparent resin substrate Absorption maximum wavelength | | |
|---|---|---|---|
| | Squarylium-based compound | Phthalocyanine-based compound | Difference in absorption maximum wavelength |
| Ex. A1 | 698 nm | 700 nm | 2 nm |
| Ex. A2 | 698 nm | 700 nm | 2 nm |
| Ex. A3 | 698 nm | 730 nm | 32 nm |
| Ex. A4 | 698 nm | 722 nm | 24 nm |
| Ex. A5 | 671 nm | 702 nm | 31 nm |
| Ex. A6 | 671 nm | 700 nm | 29 nm |
| Ex. A7 | 673 nm | 690 nm | 17 nm |
| Ex. A8 | 686 nm | 695 nm | 9 nm |
| Ex. A9 | 698 nm | 700 nm | 2 nm |
| Ex. A10 | 698 nm | 700 nm | 2 nm |
| Ex. A11 | 705 nm | 707 nm | 2 nm |
| Ex. A12 | 705 nm | 739 nm | 34 nm |
| Ex. A13 | 696 nm | 707 nm | 11 nm |
| Ex. A14 | 680 nm | 694 nm | 14 nm |
| Ex. A15 | 707 nm | 710 nm | 3 nm |
| Ex. A16 | 705 nm | 707 nm | 2 nm |
| Ex. A17 | 706 nm | 709 nm | 3 nm |
| Ex. A18 | 706 nm | 708 nm | 2 nm |
| Ex. A19 | 697 nm | 699 nm | 2 nm |
| Ex. A20 | 698 nm | 701 nm | 3 nm |
| Ex. A21 | 705 nm | 707 nm | 2 nm |
| Ex. A22 | 711 nm | 713 nm | 2 nm |
| Ex. A23 | 697 nm | 699 nm | 2 nm |
| Comp. Ex. A1 | — | — | — |
| Comp. Ex. A2 | — | — | — |
| Comp. Ex. A3 | — | — | — |
| Comp. Ex. A4 | 698 nm | — | — |
| Comp. Ex. A5 | — | 700 nm | — |
| Comp. Ex. A6 | 698 nm | — | — |

Example B1

In a container, 100 parts by weight of the resin A obtained in Synthesis Example 1, 0.03 part by weight of a squarylium-based compound (a-16), 0.01 part by weight of a cyanine-based compound (c-19) and methylene chloride were placed to obtain a solution (ex1) having a resin concentration of 20% by weight. Then, the resulting solution was cast onto a smooth glass plate and dried at 20° C. for 8 hours, and thereafter, the resulting coating film was peeled off from the glass plate. The coating film thus peeled off was further dried at 100° C. for 8 hours under reduced pressure to obtain a substrate having a thickness of 0.1 mm, a length of 60 mm and a width of 60 mm.

A spectral transmittance of this substrate was measured, and an absorption maximum wavelength, a transmittance at the absorption maximum wavelength and a transmittance in the visible wavelength region were determined. The results are set forth in Table 13.

Subsequently, on one surface of the resulting substrate, a multilayer deposited film [silica ($SiO_2$, thickness: 83 to 199 nm) layer and titania ($TiO_2$, thickness: 101 to 125 nm) layer were alternately laminated, number of layers laminated: 20], which reflected near-infrared rays at a deposition temperature of 100° C., was formed, and on the other surface of the substrate, a multilayer deposited film [silica ($SiO_2$, thickness: 77 to 189 nm) layer and titania ($TiO_2$, thickness: 84 to 118 nm) layer were alternately laminated, number of layers laminated: 26], which reflected near-infrared rays at a deposition temperature of 100° C., was formed, whereby an optical filter having a thickness of 0.105 mm was obtained. A spectral transmittance of this optical filter was measured, and optical properties in each wavelength region were evaluated. The results are set forth in Table 13.

The mean transmittance in the wavelength region of 430 to 580 nm was 90%, and the mean transmittance in the wavelength region of 800 to 1000 nm was 1% or less.

Example B2

On one surface of the substrate having a thickness of 0.1 mm, a length of 60 mm and a width of 60 mm, which had been obtained in Example B1, a multilayer deposited film [silica ($SiO_2$, thickness: 120 to 190 nm) layer and titania ($TiO_2$, thickness: 70 to 120 nm) layer were alternately laminated, number of layers laminated: 40], which reflected near-infrared rays at a deposition temperature of 100° C., was formed to produce an optical filter having a thickness of 0.104 mm, and the optical filter was evaluated. The results are set forth in Table 13.

[Example B3] to [Example B15] and [Comparative Example B1] to [Comparative Example B4]

Optical filters each having a thickness of 0.105 mm were produced in the same manner as in Example B1, except that the resins, the solvents, the dyes and the film drying conditions shown in Table 12 were adopted. The conditions for producing optical filters are set forth in Table 12, and the evaluation results are set forth in Table 13. In Table 12, the amount of each resin added is 100 parts by weight, and the concentration of each resin solution is 20% by weight. The resins G to K other than the resins A to F produced in the aforesaid synthesis examples, the solvents and the film drying conditions in Table 12 are the same as the resins G to K, the solvents and the film drying conditions in Table 9.

TABLE 12

| | | | Composition of resin solution | | | | Constitution |
| --- | --- | --- | --- | --- | --- | --- | --- |
| | Resin | Solvent | Squarylium-based compound | Cyanine-based compound | Other compounds | Film drying conditions | of multilayer deposited film |
| Ex. B1 | resin A | solvent (1) | (a-16) 0.03 part by weight | (c-19) 0.01 part by weight | — | condition (1) | both surfaces (20 layers + 26 layers) |
| Ex. B2 | resin A | solvent (1) | (a-16) 0.03 part by weight | (c-19) 0.01 part by weight | — | condition (1) | one surface 40 layers |
| Ex. B3 | resin A | solvent (1) | (a-22) 0.02 part by weight | (c-18) 0.02 part by weight | — | condition (1) | both surfaces (20 layers + 26 layers) |
| Ex. B4 | resin A | solvent (1) | (a-22) 0.02 part by weight | (c-19) 0.02 part by weight | — | condition (1) | both surfaces (20 layers + 26 layers) |
| Ex. B5 | resin B | solvent (1) | (a-16) 0.03 part by weight | (c-19) 0.01 part by weight | — | condition (1) | both surfaces (20 layers + 26 layers) |
| Ex. B6 | resin C | solvent (2) | (a-22) 0.02 part by weight | (c-18) 0.02 part by weight | — | condition (2) | both surfaces (20 layers + 26 layers) |
| Ex. B7 | resin C | solvent (2) | (a-16) 0.03 part by weight | (c-19) 0.01 part by weight | — | condition (2) | both surfaces (20 layers + 26 layers) |
| Ex. B8 | resin D | solvent (1) | (a-16) 0.03 part by weight | (c-19) 0.01 part by weight | — | condition (1) | both surfaces (20 layers + 26 layers) |
| Ex. B9 | resin E | solvent (1) | (a-16) 0.03 part by weight | (c-19) 0.01 part by weight | — | condition (1) | both surfaces (20 layers + 26 layers) |
| Ex. B10 | resin F | solvent (3) | (a-16) 0.03 part by weight | (c-19) 0.01 part by weight | — | condition (2) | both surfaces (20 layers + 26 layers) |
| Ex. B11 | resin G | solvent (4) | (a-16) 0.03 part by weight | (c-19) 0.01 part by weight | — | condition (3) | both surfaces (20 layers + 26 layers) |
| Ex. B12 | resin H | solvent (5) | (a-16) 0.03 part by weight | (c-19) 0.01 part by weight | — | condition (4) | both surfaces (20 layers + 26 layers) |
| Ex. B13 | resin I | solvent (1) | (a-16) 0.03 part by weight | (c-19) 0.01 part by weight | — | condition (1) | both surfaces (20 layers + 26 layers) |
| Ex. B14 | resin J | solvent (6) | (a-16) 0.03 part by weight | (c-19) 0.01 part by weight | — | condition (2) | both surfaces (20 layers + 26 layers) |
| Ex. B15 | resin K | solvent (1) | (a-16) 0.03 part by weight | (c-19) 0.01 part by weight | — | condition (1) | both surfaces (20 layers + 26 layers) |
| Comp. Ex. B1 | resin A | solvent (1) | — | — | — | condition (1) | both surfaces (20 layers + 26 layers) |
| Comp. Ex. B2 | resin A | solvent (1) | (a-16) 0.04 part by weight | — | — | condition (1) | both surfaces (20 layers + 26 layers) |
| Comp. Ex. B3 | resin A | solvent (1) | — | (c-19) 0.04 part by weight | — | condition (1) | both surfaces (20 layers + 26 layers) |
| Comp. Ex. B4 | resin A | solvent (1) | (a-16) 0.02 part by weight | (c-18) 0.02 part by weight | — | condition (1) | both surfaces (20 layers + 26 layers) |

TABLE 13

| | Transparent resin substrate Absorption maximum wavelength | | | Optical filter | | | |
|---|---|---|---|---|---|---|---|
| | Squarylium-based compound | Cyanine-based compound | Difference in absorption maximum wavelength | Mean value of transmittances in wavelength region of 430 nm to 580 nm | Mean value of transmittances in wavelength region of 800 nm to 1000 nm | \|Xa-Xb\| | Scattered light intensity in wavelength region of 700 nm to 715 nm |
| Ex. B1 | 698 nm | 725 nm | 27 nm | 90% | 1% or less | 3 nm | 0.21% |
| Ex. B2 | 698 nm | 725 nm | 27 nm | 90% | 1% or less | 3 nm | 0.21% |
| Ex. B3 | 671 nm | 695 nm | 24 nm | 91% | 1% or less | 4 nm | 0.24% |
| Ex. B4 | 671 nm | 725 nm | 54 nm | 90% | 1% or less | 4 nm | 0.24% |
| Ex. B5 | 707 nm | 733 nm | 26 nm | 76% | 1% or less | 5 nm | 0.20% |
| Ex. B6 | 677 nm | 702 nm | 25 nm | 88% | 1% or less | 4 nm | 0.23% |
| Ex. B7 | 710 nm | 737 nm | 27 nm | 86% | 1% or less | 5 nm | 0.24% |
| Ex. B8 | 705 nm | 732 nm | 27 nm | 86% | 1% or less | 6 nm | 0.24% |
| Ex. B9 | 708 nm | 735 nm | 27 nm | 87% | 1% or less | 5 nm | 0.23% |
| Ex. B10 | 709 nm | 736 nm | 27 nm | 86% | 1% or less | 6 nm | 0.24% |
| Ex. B11 | 697 nm | 724 nm | 27 nm | 89% | 1% or less | 4 nm | 0.22% |
| Ex. B12 | 698 nm | 725 nm | 27 nm | 88% | 1% or less | 4 nm | 0.21% |
| Ex. B13 | 707 nm | 734 nm | 27 nm | 86% | 1% or less | 5 nm | 0.21% |
| Ex. B14 | 712 nm | 739 nm | 27 nm | 86% | 1% or less | 7 nm | 0.24% |
| Ex. B15 | 697 nm | 724 nm | 27 nm | 90% | 1% or less | 5 nm | 0.24% |
| Comp. Ex. B1 | — | — | — | 92% | 1% or less | 25 nm | 0.06% |
| Comp. Ex. B2 | 698 nm | — | — | 91% | 1% or less | 3 nm | 0.63% |
| Comp. Ex. B3 | — | 725 nm | — | 90% | 1% or less | 25 nm | 0.04% |
| Comp. Ex. B4 | 698 nm | 695 nm | −3 nm | 90% | 1% or less | 3 nm | 0.42% |

INDUSTRIAL APPLICABILITY

The optical filter of the present invention can be favorably used for digital still camera, camera for cellular phone, digital video camera, PC camera, surveillance camera, camera for automobile, TV, car navigation system, personal digital assistant, personal computer, video game console, handheld game console, fingerprint authentication system, digital music player, etc. Moreover, the optical filter can be favorably used also as a heat ray cut filter mounted on glass or the like of automobile, building, etc.

REFERENCE SIGNS LIST

1: camera module
2: lens barrel
3: flexible substrate
4: hollow package
5: lens
6: optical filter
6': optical filter of the present invention
7: CCD or CMOS image sensor
8: optical filter
9: spectrophotometer
10: light
11: incident light
12: near-infrared cut filter
13: transmitted light
14: scattered light
15: integrating sphere
16: sensor
17: carbon feather sheet (provided for the purpose of inhibiting diffused reflection of transmitted light in integrating sphere)

The invention claimed is:

1. A near-infrared cut filter comprising:
near-infrared absorbing dye which comprises a squarylium-based compound (A) and a phthalocyanine-based compound (B-1),
wherein the absorption maximum of the squarylium-based compound (A) is present on the side of shorter wavelength than the absorption maximum of the phthalocyanine-based compound (B-1),
wherein the squarylium-based compound (A) has the absorption maximum in the wavelength region of not less than 650 nm but less than 740 nm, and the phthalocyanine-based compound (B-1) has the absorption maximum in the wavelength region of more than 670 nm but not more than 760 nm, and the difference in the absorption maximum wavelength between the squarylium-based compound (A) and the phthalocyanine-based compound (B—I) is from 10 to 60 nm, and
wherein an average transmittance of the near-infrared cut filter in a wavelength region of from 430 nm to 580 nm is at least 87%, and an average transmittance of the near-infrared cut filter in a wavelength region of from 800 nm to 1000 nm is at most 1%.

2. The near-infrared cut filter according to claim 1, which comprises a resin substrate comprising the near-infrared absorbing dye and a resin.

3. The near-infrared cut filter according to claim 2, wherein the content of the total near-infrared absorbing dye is 0.01 to 5.0 parts by weight based on 100 parts by weight of the resin.

4. The near-infrared cut filter according to claim 3, wherein the resin is at least one resin selected from the group consisting of a cyclic polyolefin-based resin, an aromatic polyether-based resin, a polyimide-based resin, a fluorene polycarbonate-based resin, a fluorene polyester-based resin, a polycarbonate-based resin, a polyamide-based resin, a polyarylate-based resin, a polysulfone-based resin, a polyether sulfone-based resin, a polyparaphenylene-based resin, a polyamidoimide-based resin, a polyethylene naphthalate-based resin, a fluorinated aromatic polymer-based resin, a (modified) acrylic resin, an epoxy-based resin, an allyl ester-based curing resin and a silsesquioxane-based ultraviolet curing resin.

5. The near-infrared cut filter according to claim 1, which further comprises at least one near-ultraviolet absorbing agent selected from the group consisting of an azomethine-based compound, an indole-based compound, a benzotriazole-based compound and a triazine-based compound.

6. The near-infrared cut filter according to claim 1, which is for a solid-state image pickup device.

7. A solid-state image pickup device comprising the near-infrared cut filter according to claim 6.

8. A camera module comprising the near-infrared cut filter according to claim 6.

9. The near-infrared cut filter according to claim 1, wherein when the amount of the total near-infrared absorbing dye is 100% by weight, the content of the squarylium-based compound (A) is 20 to 95% by weight, and the content of the phthalocyanine-based compound (B-1) is 5 to 80% by weight.

10. The near-infrared cut filter according to claim 1, wherein the squarylium-based compound (A) is a compound represented by the following formula (I) or (II):

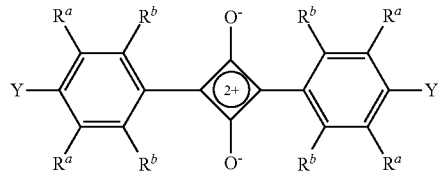

wherein $R^a$, $R^b$ and Y satisfy the following condition (i) or (ii):
(i) plural $R^a$ are each independently a hydrogen atom, a halogen atom, a sulfo group, a hydroxyl group, a cyano group, a nitro group, a carboxyl group, a phosphoric acid group, -$L^1$ or a $NR^eR^f$ group, wherein $R^e$ and $R^f$ are each independently a hydrogen atom, -$L^a$, -$L^b$, -$L^c$, -$L^d$ or $L^e$,
plural $R^b$ are each independently a hydrogen atom, a halogen atom, a sulfo group, a hydroxyl group, a cyano group, a nitro group, a carboxyl group, a phosphoric acid group, -$L^1$ or a —$NR^gR^h$ group, wherein $R^g$ and $R^h$ are each independently a hydrogen atom, -$L^a$, -$L^b$, -$L^c$, -$L^d$, $L^e$ or a —$C(O)R^i$ group, wherein $R^i$ is -$L^a$, -$L^b$, -$L^c$, -$L^d$ or -$L^e$,
plural Y are each independently a —$NR^jR^k$ group, wherein $R^j$ and $R^k$ are each independently a hydrogen atom, -$L^a$, -$L^b$, -$L^c$, -$L^d$, or -$L^e$,
$L^1$ is
($L^a$) an aliphatic hydrocarbon group of 1 to 9 carbon atoms, which may have a substituent L,
($L^b$) a halogen-substituted alkyl group of 1 to 9 carbon atoms, which may have a substituent L,
($L^c$) an alicyclic hydrocarbon group of 3 to 14 carbon atoms, which may have a substituent L,
($L^d$) an aromatic hydrocarbon group of 6 to 14 carbon atoms, which may have a substituent L,
($L^e$) a heterocyclic group of 3 to 14 carbon atoms, which may have a substituent L,
($L^1$) an alkoxy group of 1 to 9 carbon atoms, which may have a substituent L,
($L^g$) an acyl group of 1 to 9 carbon atoms, which may have a substituent L, or
($L^h$) an alkoxycarbonyl group of 1 to 9 carbon atoms, which may have a substituent L,
the substituent L is at least one kind selected from the group consisting of an aliphatic hydrocarbon group of 1 to 9 carbon atoms, a halogen-substituted alkyl group of 1 to 9 carbon atoms, an alicyclic hydrocarbon group of 3 to 14 carbon atoms, an aromatic hydrocarbon group of 6 to 14 carbon atoms and a heterocyclic group of 3 to 14 carbon atoms, and the above $L^a$ to $L^h$ may further have at least one atom or group selected from the group consisting of a halogen atom, a sulfo group, a hydroxyl group, a cyano group, a nitro group, a carboxyl group, a phosphoric acid group and an amino group;
(ii) at least one of two $R^a$ on one benzene ring and Y on the same benzene ring are bonded to each other to form a heterocyclic ring of 5 or 6 constituent atoms containing at least one nitrogen atom, and the heterocyclic ring may have a substituent, and
$R^b$ and $R^a$ which does not take part in the formation of the heterocyclic ring have the same meanings as those of $R^b$ and $R^a$ in the condition (i), respectively;

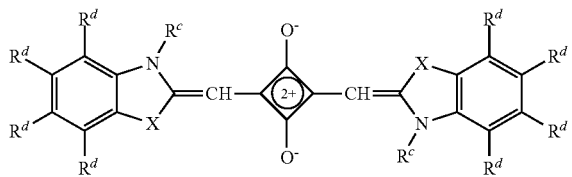

wherein X is O, S, Se, N—$R^c$ or C—$R^dR^d$,
plural $R^e$ are each independently a hydrogen atom, -$L^a$, -$L^b$, -$L^c$, -$L^d$ or -$L^e$,
plural $R^d$ are each independently a hydrogen atom, a halogen atom, a sulfo group, a hydroxyl group, a cyano group, a nitro group, a carboxyl group, a phosphoric acid group, -$L^1$ or a —$NR^eR^f$ group, and neighboring $R^d$ and $R^d$ may be bonded to each other to form a ring which may have a substituent, and
$L^a$ to $L^e$, $L^1$, $R^e$ and $R^f$ have the same meanings as those of $L^a$ to $L^e$, $L^1$, $R^e$ and $R^f$ defined in the formula (I).

11. The near-infrared cut filter according to claim 10, wherein the phthalocyanine-based compound (B-1) is a compound represented by the following formula (III):

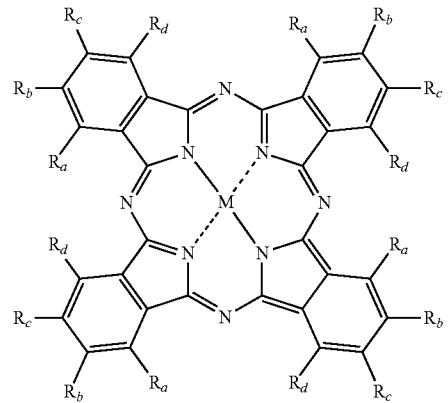

wherein M represents two hydrogen atoms, two monovalent metal atoms, a divalent metal atom, or substituted metal atoms containing a trivalent or tetravalent metal atom, plural $R_a$, $R_b$, $R_c$ and $R_d$ are each independently a hydrogen atom, a halogen atom, a hydroxyl group, a carboxyl group, a nitro group, an amino group, an amide group, an imide group, a cyano group, a silyl group, -$L^1$, —S-$L^2$, —SS-$L^2$, —SO$_2$-$L^3$ or —N═N-$L^4$, or at least one combination of $R_a$ and $R_b$, $R_b$ and $R_c$, and $R^c$ and $R_d$ is bonded to form at least one group selected from the group consisting of groups represented by the following formulas (A) to (H), and at least one of $R_a$, $R_b$, $R_c$ and $R_d$ bonded to the same aromatic ring is not a hydrogen atom, the amino group, the amide group, the imide group and the silyl group may have a substituent L defined in the formula (I), $L^1$ has the same meaning as that of $L^1$ defined in the formula (I), $L^2$ is a hydrogen atom or any one of $L^a$ to $L^e$ defined in the formula (I), $L^3$ is a hydroxyl group or any one of the above $L^a$ to $L^e$, and $L^4$ is any one of the above $L^a$ to $L^e$;

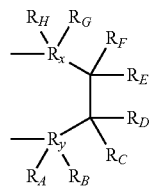
(A)

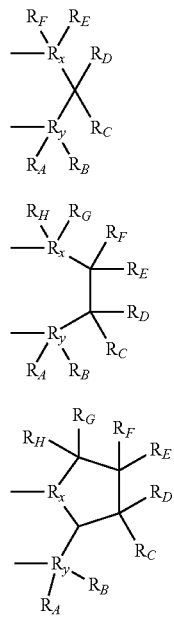
(B)

(C)

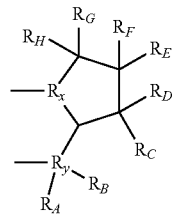
(D)

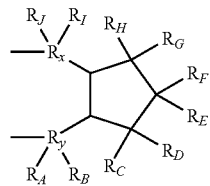
(E)

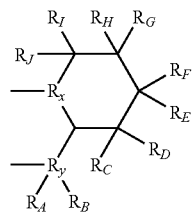

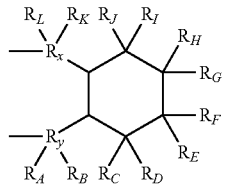
(F)

(G)

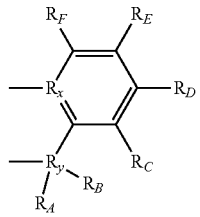

(H)

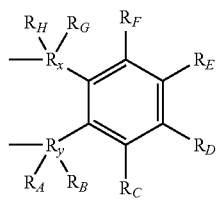

wherein a combination of $R_x$ and $R_y$ is a combination of $R_a$ and $R_b$, $R_b$ and $R_c$, or $R_c$ and $R_d$, and plural $R_A$ to $R_L$ are each independently a hydrogen atom, a halogen atom, a hydroxyl group, a nitro group, an amino group, an amide group, an imide group, a cyano group, a silyl group, -$L^1$, —S-$L^2$, —SS-$L^2$, —SO$_2$-$L^3$ or —N═N-$L^4$, wherein $L^1$ to $L^4$ have the same meanings as those of $L^1$ to $L^4$ defined in the formula (III), and the amino group, the amide group, the imide group and the silyl group may have the substituent L.

12. The near-infrared cut filter according to claim 11, wherein M in the formula (III) is a divalent transition metal, a halide of a trivalent or tetravalent metal or an oxide of a tetravalent metal, each of said metals belonging to the periodic table Group 5 to Group 11 and belonging to the periodic table Period 4 to Period 5.

13. The near-infrared cut filter according to claim 1, wherein the phthalocyanine-based compound (B-1) is a compound represented by the following formula (III):

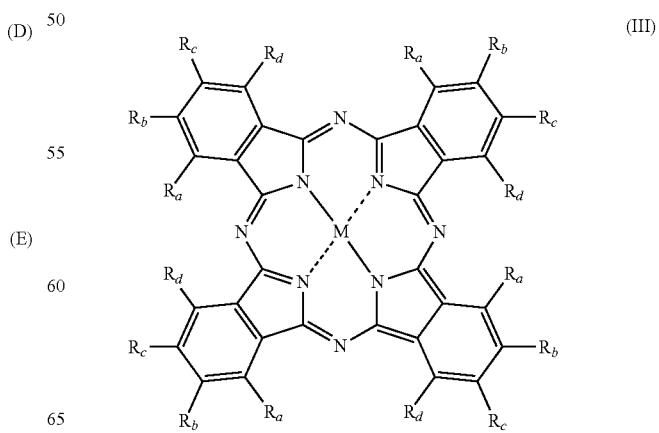
(III)

wherein M represents two hydrogen atoms, two monovalent metal atoms, a divalent metal atom, or substituted metal atoms containing a trivalent or tetravalent metal atom, plural $R_a$, $R_b$, $R_c$ and $R_d$ are each independently a hydrogen atom, a halogen atom, a hydroxyl group, a carboxyl group, a nitro group, an amino group, an amide group, an imide group, a cyano group, a silyl group, $-L^1$, $-S-L^2$, $-SS-L^2$, $-SO_2-L^3$ or $-N=N-L^4$, or at least one combination of $R_a$ and $R_b$, $R_b$ and $R_c$ and $R_c$ and $R_d$ is bonded to form at least one group selected from the group consisting of groups represented by the following formulas (A) to (H), and at least one of $R_a$, $R_b$, $R_c$ and $R_d$ bonded to the same aromatic ring is not a hydrogen atom, the amino group, the amide group, the imide group and the silyl group may have a substituent L, wherein L is at least one kind selected from the group consisting of an aliphatic hydrocarbon group of 1 to 9 carbon atoms, a halogen-substituted alkyl group of 1 to 9 carbon atoms, an alicyclic hydrocarbon group of 3 to 14 carbon atoms, an aromatic hydrocarbon group of 6 to 14 carbon atoms and a heterocyclic group of 3 to 14 carbon atoms, $L^1$ is
($L^a$) an aliphatic hydrocarbon group of 1 to 9 carbon atoms, which may have a substituent L,
($L^b$) a halogen-substituted alkyl group of 1 to 9 carbon atoms, which may have a substituent L,
($L^c$) an alicyclic hydrocarbon group of 3 to 14 carbon atoms, which may have a substituent L,
($L^d$) an aromatic hydrocarbon group of 6 to 14 carbon atoms, which may have a substituent L,
($L^e$) a heterocyclic group of 3 to 14 carbon atoms, which may have a substituent L,
($L^f$) an alkoxy group of 1 to 9 carbon atoms, which may have a substituent L,
($L^g$) an acyl group of 1 to 9 carbon atoms, which may have a substituent L, or
($L^h$) an alkoxycarbonyl group of 1 to 9 carbon atoms, which may have a substituent L, $L^a$ to $L^h$ may further have at least one atom or group selected from the group consisting of a halogen atom, a sulfo group, a hydroxyl group, a cyano group, a nitro group, a carboxyl group, a phosphoric acid group and an amino group, $L^2$ is a hydrogen atom or any one of $L^a$ to $L^e$,
$L^3$ is a hydroxyl group or any one of the above $L^a$ to $L^e$, and
$L^4$ is any one of the above $L^a$ to $L^e$;

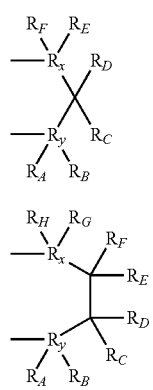

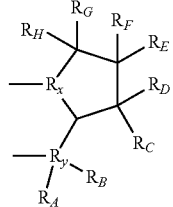

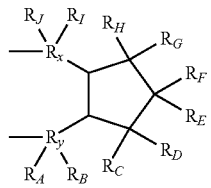

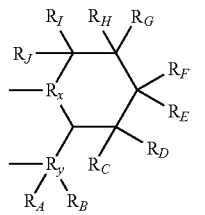

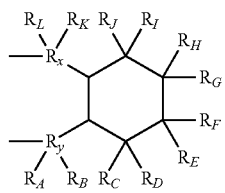

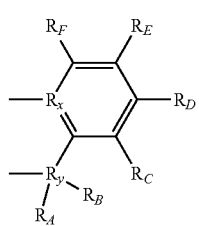

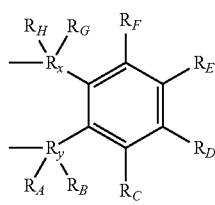

wherein a combination of $R_x$ and $R_y$ is a combination of $R_a$ and $R_b$, $R_b$ and $R_c$, or $R_c$ and $R_d$, and plural $R_A$ to $R_L$ are each independently a hydrogen atom, a halogen atom, a hydroxyl group, a nitro group, an amino group, an amide group, an imide group, a cyano group, a silyl group, $-L^1$, $-S-L^2$, $-SS-L^2$, $-SO_2-L^3$ or $-N=N-L^4$, wherein $L^1$ to $L^4$ have the same meanings as those of $L^1$ to $L^4$ defined in the formula (III), and the amino group, the amide group, the imide group and the silyl group may have the substituent L.

14. The near-infrared cut filter according to claim 13, wherein M in the formula (III) is a divalent transition metal, a halide of a trivalent or tetravalent metal or an oxide of a tetravalent metal, each of said metals belonging to the periodic table Group 5 to Group 11 and belonging to the periodic table Period 4 to Period 5.

* * * * *